(12) United States Patent
Shpantzer et al.

(10) Patent No.: US 7,076,169 B2
(45) Date of Patent: Jul. 11, 2006

(54) SYSTEM AND METHOD FOR ORTHOGONAL FREQUENCY DIVISION MULTIPLEXED OPTICAL COMMUNICATION

(75) Inventors: Isaac Shpantzer, Bethesda, MD (US); Yehouda Meiman, Rishon Letzion (IL); Michael Tseytlin, Bethesda, MD (US); Olga Ritterbush, Rockville, MD (US); Aviv Salamon, Washington, DC (US); Peter Feldman, Short Hills, NJ (US); Alper Demir, Istanbul (TR); Peter Kinget, Summit, NJ (US); Nagendra Krishnapura, Hoboken, NJ (US); Jaijeet Roychowdhury, Minneapolis, MN (US)

(73) Assignee: CeLight, Inc., Silver Spring, MD (US)

( * ) Notice: Subject to any disclaimer, the term of this patent is extended or adjusted under 35 U.S.C. 154(b) by 689 days.

(21) Appl. No.: 10/087,022

(22) Filed: Feb. 28, 2002

(65) Prior Publication Data

US 2002/0186435 A1    Dec. 12, 2002

Related U.S. Application Data

(63) Continuation-in-part of application No. 09/962,243, filed on Sep. 26, 2001.
(60) Provisional application No. 60/234,930, filed on Sep. 26, 2000.

(51) Int. Cl.
*H04J 14/06* (2006.01)
*H04J 4/00* (2006.01)
*H04B 10/00* (2006.01)
*H04B 10/04* (2006.01)
*H04B 10/06* (2006.01)

(52) U.S. Cl. .............................. 398/76; 398/65; 398/74; 398/152; 398/163; 398/184; 398/185; 398/205

(58) Field of Classification Search ................... 398/79, 398/152, 204, 65, 74, 76, 91, 140, 163, 184, 398/203, 185, 205
See application file for complete search history.

(56) References Cited

U.S. PATENT DOCUMENTS

| 4,096,448 | A |   | 6/1978 | Hays |
|-----------|---|---|--------|------|
| 5,212,825 | A | * | 5/1993 | Layton ........................ 455/205 |
| 5,347,525 | A |   | 9/1994 | Faris |

(Continued)

OTHER PUBLICATIONS

Dutton, Harry J.R., "Wavelength Division Multiplexing," *Understanding Optical Communications*, pp. 513-568, (1998).

(Continued)

*Primary Examiner*—Leslie Pascal
*Assistant Examiner*—Dalzid Singh
(74) *Attorney, Agent, or Firm*—Paul Davis; Heller Ehrman LLP

(57) ABSTRACT

A system for optical communication send optical signals over a plurality of wavelength channels. Each wavelength channel comprises a number of orthogonal subchannel frequencies which are spaced apart from one another by a predetermined amount. Each of the subchannel frequencies is modulated with data from a data stream. The data modulation scheme splits a subchannel frequency code into H and V components, and further processes the components prior to modulation with data. The various data-modulated subchannels are then combined into a single channel for transmission. The received signals are detected and demodulated with the help of a symbol timing recovery module which establishes the beginning and end of each symbol. A polarization mode distortion compensation module at the receiver is used to mitigate the effects to polarization more distortion in the fiber.

32 Claims, 20 Drawing Sheets

U.S. PATENT DOCUMENTS

| | | | | |
|---|---|---|---|---|
| 5,838,727 A | * | 11/1998 | Lyon et al. | 375/261 |
| 5,841,557 A | * | 11/1998 | Otsuka et al. | 398/65 |
| 5,896,211 A | * | 4/1999 | Watanabe | 398/76 |
| 5,965,874 A | * | 10/1999 | Aso et al. | 250/225 |
| 6,008,931 A | * | 12/1999 | von Helmolt et al. | 359/326 |
| 6,915,077 B1 | * | 7/2005 | Lo | 398/47 |

OTHER PUBLICATIONS

Kazovsky, Leonid G., et al., "All-fiber 90 Optical Hybrid for Coherent Communications," *Applied Optics*, 26:3, 437-439, (Feb. 1987).

\* cited by examiner

SYSTEM AND METHOD FOR ORTHOGONAL FREQUENCY DIVISION MULTIPLEXED OPTICAL COMMUNICATION

RELATED APPLICATIONS

The present application is a continuation-in-part of U.S. application Ser. No. 09/962,243, filed Sep. 26, 2001, which itself claims priority to U.S. provisional application No. 60/234,930, filed Sep. 26, 2000.

FIELD OF THE INVENTION

The present invention relates to the field of optical communication systems utilizing modulation techniques to obtain high spectral efficiency.

BACKGROUND OF THE INVENTION

Dense wavelength division multiplexing (DWDM) increases the capacity of embedded fiber by assigning incoming optical signals to specific frequencies (wavelength, lambda) within a designated frequency band and then multiplexing the resulting signals out onto one fiber. DWDM combines multiple optical signals so that they can be amplified as a group and transported over a single fiber to increase capacity of the telecommunication network. Each signal carried can be at a different rate (OC-3/12/24, etc.) and in a different format (SONET, ATM, data, etc.). Limiting bandwidth of the useable band of the optical fiber to accommodate future growth is the driving force behind the effort to increase the spectral efficiency of DWDM systems.

FIG. 1 is a block diagram of a prior art simplex DWDM system. A DWDM multiplexer 110 combines several optical signals, hereinafter referred to as channels, into a single multi-channel optical signal that is transmitted through the optical fiber 120. Optical amplifiers 125 may be connected to the optical fiber 120 to amplify the optical signal. Conversely, the DWDM demultiplexer 130 receives the multi-channel optical signal transmitted through the optical fiber 120 and splits it into separate channels. Each channel is characterized by a distinct wavelength designated as $\lambda_i$ in FIG. 1 where the index, i, runs from 1 to N where N is the number of channels in the DWDM system. It is understood that a wavelength has a corresponding frequency $f_i$ and that one may refer to either frequency or wavelength while meaning the same physical attribute of the signal. For an N-channel DWDM system, there are N transmitters 140 and N receivers 150 with one transmitter 140 and one receiver 150 for each channel. A transmitter 140 generates the optical carrier signal at the channel wavelength and modulates the carrier signal with a single data stream before transmitting the modulated optical signal to the multiplexer 110. The multiplexer 110 then combines the N modulated optical signals having different channel wavelengths into a single multi-channel optical signal, and sends this through the fiber 120. The demultiplexer 130 receives the multi-channel optical signal and separates it into the different channel wavelengths. Each receiver 150 then demodulates one of the demultiplexed channel signals to extract the data signal. While FIG. 1 shows a prior art simple system, it is understood that in real life, a duplex system is used, with one or more transmitters and receivers at each end. Dutton, Harry J. R., *Understanding Optical Communications*, 1998, pp. 513–568, ISBN 0-13-020141-3 presents a description of the DWDM system and of its components and is herein incorporated by reference.

The data rate (in bits per second or bps) through a single optical fiber may be increased by combining one or more of the following methods: increasing the data modulation rate; increasing the number of channels per fiber; and selecting a modulation method having a higher spectral efficiency.

Increasing the data modulation rate is limited by semiconductor technology and cost, as well as frequency-dependent fiber impairments as chromatic and Polarization Mode Dispersion (PMD). Increasing the number of channels per fiber is limited by the properties of optical component materials. Current and proposed implementations of DWDM systems use a channel modulation rate of about 10 GHz (OC-192) and use 40 channels over the conventional optical band (C-band) between 1530 nm and 1560 nm. Therefore, the transmission bit-rate through a single optical fiber is about 400 Gbps. Each channel has a bandwidth of about 100 GHz. The spectral efficiency is defined as the channel bit-rate divided by the channel bandwidth. The spectral efficiency of the system is therefore 0.1 bit/Hz. The spectral efficiency may be doubled by using a coherent modulation technique such as quadrature phase shift keying (QPSK). QPSK encodes two bits per modulation period and therefore doubles the channel transmission bit-rate to 20 Gbps. The two bits encoded during QPSK are referred to as a symbol and the modulation period is referred to as the symbol period. The inverse of the symbol period is the symbol rate.

The channel bit-rate may also be doubled by combining two data streams into a single channel. U.S. Pat. No. 6,038,357 issued to Pan discloses a fiber optic network that combines two data streams into a single channel by polarizing the optical signal modulated by the first data stream to a polarization plane that is orthogonal to the polarization plane of the optical signal modulated by the second data stream.

Polarization mode dispersion (PMD) arises in optical fiber when circular symmetry is broken by the presence of an elliptical core or by noncircularly symmetric stresses. The loss of circular symmetry results in the difference in the group velocities associated with the two polarization modes of the fiber. The main effect of the PMD is the splitting of the narrow-band pulse into two orthogonally polarized pulses (dual imaging) that propagate through the fiber with the different group velocities. As the dual images propagate through the birefringent fiber, there states of polarization (SOP) constantly undergo changes causing the random coupling between the two images.

The PMD varies randomly from fiber to fiber. In the single fiber, the PMD also varies randomly with the optical carrier frequency and ambient temperature. PMD broadens and degrades the signal and limits the distance the signal may propagate before the information encoded in the signal is lost.

Therefore, there remains a need to improve the spectral efficiency of existing/planned DWDM standards (OC-48 at 2.048 Gbps or OC-192 at 10 Gbps) using existing fiber optic cables. There also remains a need for PMD compensation of the received optical signal.

SUMMARY OF THE INVENTION

In one aspect, the present invention is directed to a subchannel frequency division multiplexing (FDM) system comprising a transmitter and receiver. The transmitter allows each DWDM channel to carry K subchannels, each subchannel modulated with a separate data stream. Each subchannel is characterized by a subchannel frequency, $f_k$, and each subchannel frequency is separated from adjacent subchannels by a constant frequency spacing, $\Delta f$. The receiver extracts each subchannel by mixing the channel signal with a local reference laser having the same frequency as the subchannel frequency. The symbol information is recovered by integrating the mixed signal over a symbol period $1/\Delta f$, or a part thereof.

In another aspect, the present invention is directed to an optical communication transmitter. The transmitter includes at least one light source arranged to output a number K subchannel light beams, each subchannel light beam being spaced apart from adjacent subchannel light beams by a constant subchannel frequency spacing $\Delta f$. The transmitter also includes K data modulators, one to modulate each subchannel light beam with data from a data stream, wherein each data modulator includes a polarization beam combiner which encodes data from said data stream on two orthogonal polarizations to form a subchannel signal. The transmitter also may include a combiner configured to the combine K subchannel signals to thereby form an optical channel signal.

The transmitter may include a pulse shaper circuit to shape each subchannel light beam prior to modulation with the data.

The transmitter's light source may comprise individual light sources, each outputting a single frequency. A frequency calibration circuit may be used to ensure even amplitude and spacing between the outputs of the individual light sources. Frequency calibration of the subchannel carrier signals is accomplished by determining the mean signal of the subchannel carrier mixed with a delayed version of itself. The frequency separation, $\Delta\omega$ is proportional to the difference between the mean signals of the two subchannel carriers. Alternatively, the light source may comprise a single frequency comb generator that outputs a signal having evenly spaced, even-amplitude frequencies. Regardless of the type of light source used, the receiver may employ a frequency offset compensator.

In yet another aspect, the present invention is directed to an optical communication homodyne receiver that uses coherent detection. The homodyne receiver includes an optical splitter that output multiple identical copies of an incoming signal, a number K subchannel receivers, the $k^{th}$ subchannel receiver including optical and digital circuitry configured to receive the $k^{th}$ of said K identical received channel signals and a reference light beam having a subchannel frequency $f_k$, and output a first digital signal representative of in-phase and quadrature components of a first orthogonal polarization component associated with subchannel frequency $f_k$, and also output a second digital signal representative of in-phase and quadrature components of a second orthogonal polarization component associated with subchannel frequency $f_k$, the first and second digital signals containing information representative of the data stream that was used to modulate the $k^{th}$ subchannel signal, and a receiver processor configured to receive said first and second digital signals and output one of said K data streams.

A frequency calibration system for calibrating a number K of laser light beams may be used in conjunction with either the transmitter or a homodyne receiver. The frequency calibration system includes an optical switch system configured to select one from among the K laser light beams and a reference beam and output a selected beam, a splitter disposed to receive the selected beam and output first identical first and second selected beams, an optical detector configured to receive a delayed version of the first selected beam and the second selected beam, and output at least one electrical signal proportional to a phase difference between the two beams, and a controller configured to receive said at least one electrical signal and output at least one frequency calibration control signal to control at least one light source responsible for creating at least one of said plurality of laser light beams.

In yet another aspect, the present invention is directed to an optical communication self-homodyne receiver that uses coherent detection. The self-homodyne receiver extracts a phase difference between an incoming signal, and a one-symbol delayed version of that signal, thus obviating the need for a reference light beam. The phase difference may correspond to a differential quadrature phase shift keying (DQPSK) encoding scheme for the data.

For both the homodyne and the self-homodyne receivers, the receiver processor may include polarization mode dispersion (PMD) compensation control module, a synchronization and symbol timing module, and a data demodulation module.

The PMD compensation control module (PCM) associated with the receiver calculates the rotations needed to correct for Polarization Mode Distortion (PMD) experienced by an optical signal as it is sent from a transmitter to a receiver. The PCM optimizes the signals representing the received symbol by applying a rotation transformation to the signals.

A polarization mode dispersion (PMD) compensator device may be employed with either homodyne or a self-homodyne receiver. In such case, the angles calculated by the PCM are used to drive an optical polarization compensator device to correct for PMD. The PMD compensator device may be adjusted as each pair of candidate rotation angles is attempted during the search for an optimum pair of such angles. A metric, such as an envelope stability metric, may be used to help determine the optimum pair of rotation angles.

Instead of a PMD compensator device, the receiver's PMD compensation control module may provide for a fully digitally-implemented ("all-digital") polarization compensation. In such an embodiment, polarization compensation is done entirely digitally without the use of an optical polarization compensator device. The matrix components comprising the rotation transformation are updated in parallel to the signal processing of the received symbols thereby eliminating artificial degradations to the signals caused by the PCM's search for the optimum rotation. The optimum rotation is determined by a gradient search based on criteria matched to the data format. The digital PCM eliminates the need for an optical polarization compensator thereby significantly reducing the cost of the optical communication receiver. A metric, such as an envelope stability metric, may be used to help determine the optimum pair of rotation angles for the rotation transformation.

The symbol timing module may employ a discriminator function based on the Stokes parameters of a received subchannel signal. The symbol timing module may also employ a Muller and Muller symbol timing recovery scheme. In the case of the "all-digital" polarization compensation, a hybrid symbol timing module employing both a Stokes parameter-based scheme and a Muller and Muller based scheme may be employed. The Stokes parameter based scheme calculates a discriminator function based on inner products of Stokes vectors derived from first and second digital signals representing first and second polarization components of an optical signal.

BRIEF DESCRIPTION OF THE FIGURES

The present invention may be understood by reference to the following detailed description of the preferred embodiment of the present invention, illustrative examples of specific embodiments of the invention and the appended figures in which:

FIG. 5c is a functional diagram of the receiver processor seen in FIG. 5a.

DETAILED DESCRIPTION OF THE PREFERRED EMBODIMENT

Figure 2A:
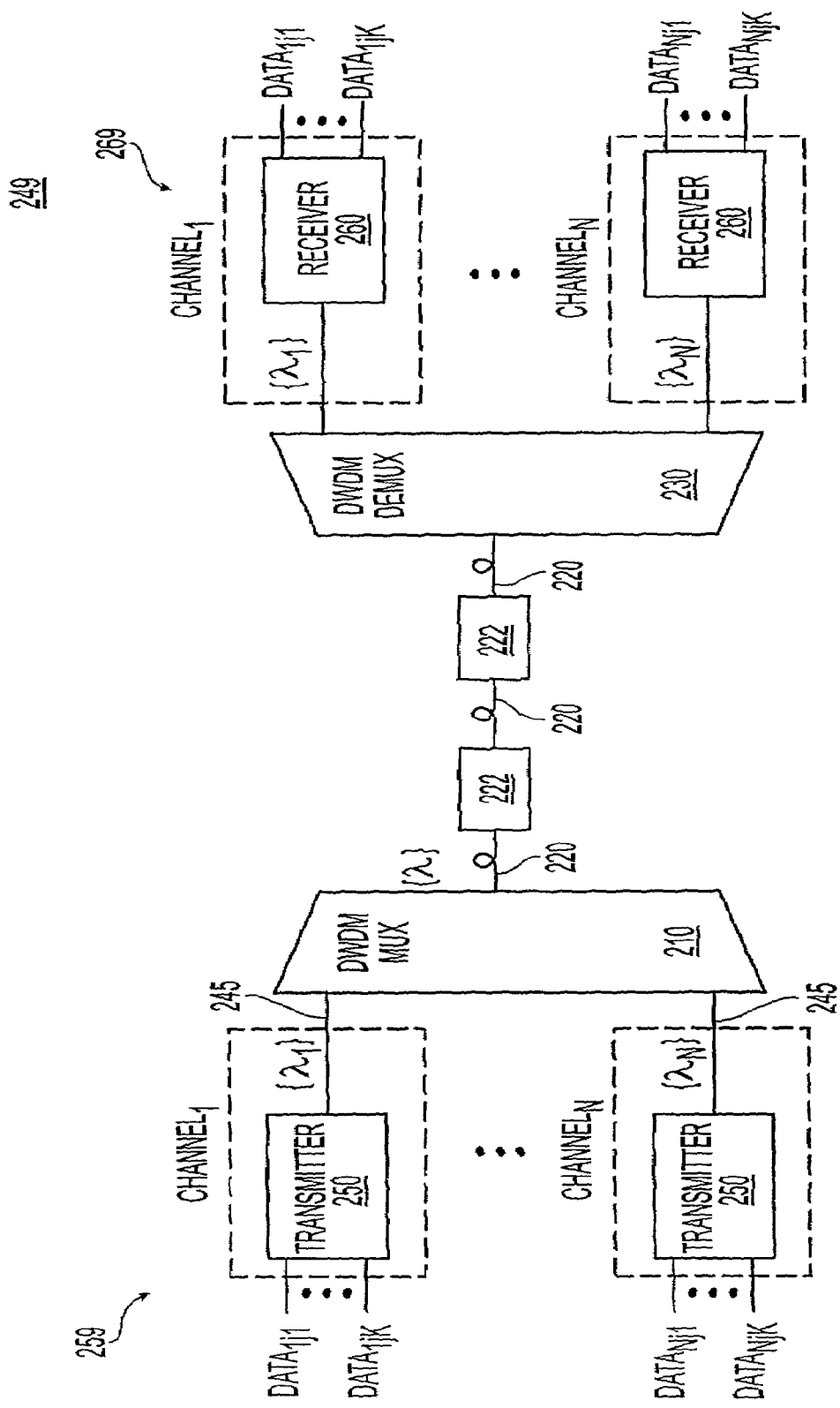
FIG. 2a is a block diagram of a simplex optical communication system in accordance with a preferred embodiment of the present invention.

FIG. 2a is a block diagram of the system architecture of a simplex DWDM communication system 249 in accordance with the present invention. The communication system 249 has a transmitter end 259 provided with multiple transmitters 250 and a receiver end 269 provided with multiple receivers 260.

Each transmitter 250 outputs an optical signal, hereinafter referred to as a channel. Each channel output by a transmitter 250 is characterized by a family or group of distinct wavelengths designated as $\{\lambda_i\}$ in FIG. 2a where the index, i, runs from 1 to N where N is the number of channels in the DWDM system. For an N-channel DWDM system, there are N transmitters 250 and N receivers 260 with one transmitter 250 and one receiver 260 for each channel.

In the communication system 249, a DWDM multiplexer 210 combines the channels output by the transmitters into a composite optical signal $\{\lambda\}$ for transmission through the optical fiber 220. Optical amplifiers 222 may be connected to the optical fiber 220 to amplify the optical signal. At the receiver end 269, the DWDM demultiplexer 230 receives the composite optical signal $\{\lambda\}$ transmitted through the optical fiber 220 and splits the received composite optical signal into the separate channels $\{\lambda_i\}$ for further processing.

Each channel transmitter 250 combines several optical signals, hereinafter referred to as subchannels, into a single channel signal. Each subchannel is characterized by a wavelength, $\lambda_{ik}$, where the index i identifies the channel and the index k identifies the subchannel. Each subchannel is capable of carrying a data stream. Thus, each channel transmitter is capable of supporting a total of K subchannels to thereby transmit K data streams. Conversely, the channel receiver 260 demodulates the channel signal to extract the K data signals 290.

As seen in FIG. 2a, each transmitter 250 receives, for its channel, a total of K data streams, the data streams being depicted by DATA$_{ijk}$, where subscript 'i' is the channel index, j is the polarization index (either 'H' or 'V') and subscript 'k' is the data stream index. For a given 'i' and 'k', the 'H' and 'V' data streams are preferably used to modulate the same subchannel on H and V polarizations. Thus, each of K subchannels, when transmitted, is used on both polarizations, and each polarization carries different data DATA$_{iHk}$ and DATA$_{iVk}$. Thus, since the index 'j' takes on only two possible values, one may consider the incoming data streams to effectively comprise 2K data streams, each having a first component that will be sent on H polarization on some subchannel $\lambda_{ik}$ and a second component that will be sent on V polarization on the same subchannel $\lambda_{ik}$.

While the above 'data stream' nomenclature may be expedient to illustrate the use of both H and V polarization in accordance with the present invention, it should be kept in mind that a single data stream may be formatted in any number of ways including the "DATA$_{ijk}$" representation discussed above. What is important is that the incoming data is used to modulate each subchannel on both H and V polarizations, with a total of K subchannels being combined and transmitted on each channel. Each subchannel includes both the 'H' and 'V' data components, i.e., both 'j' values from a "DATA$_{ijk}$" data stream and these are sent on the same frequency.

Figure 2B:
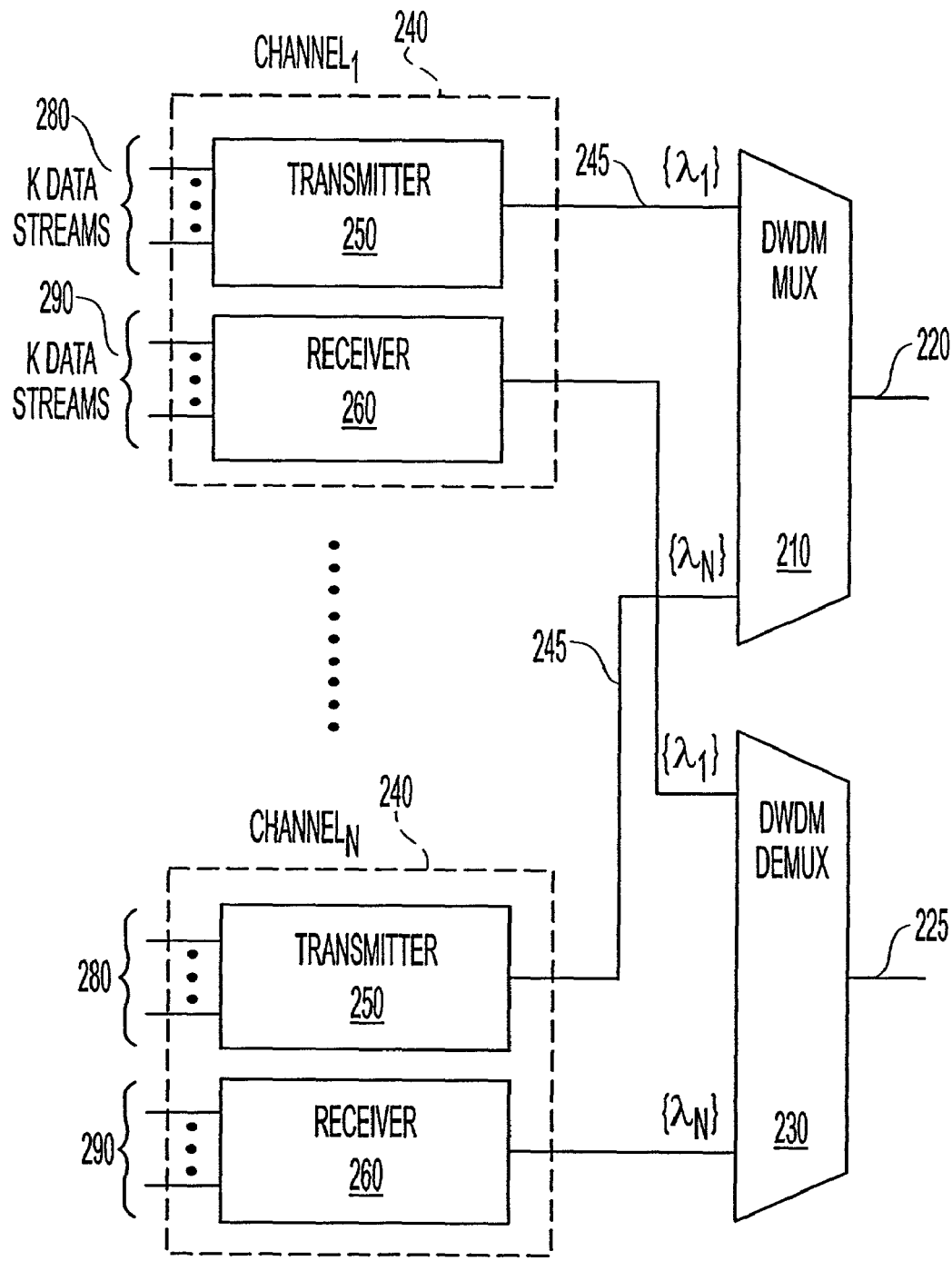
FIG. 2b is a block diagram of one-half of a duplex optical communication system in accordance with a preferred embodiment of the present invention.

FIG. 2b is a block diagram of the system architecture of another embodiment of the present invention showing one end of a bi-directional communication link. A DWDM multiplexer (MUX) 210 is connected to a downstream optical fiber 220. Similarly, a DWDM demultiplexer (DMUX) 230 is connected to an upstream optical fiber 225. At the other end (not shown) of the communication link, the downstream optical fiber 220 is connected to a DWDM demultiplexer and the upstream optical fiber 225 is connected to a DWDM multiplexer. The DWDM MUX/DMUX pair supports N channels 240. Each channel 240 has a channel transmitter (TX) 250 and a channel receiver (RX) 260. Each channel transmitter 250 is capable of combining K subchannel signals 280 wherein each subchannel is capable of carrying a data stream. Conversely, each channel receiver 260 is capable of receiving a channel signal $\{\lambda_i\}$ and recovering the K data streams 290.

Transmitter Design

Figure 3A:
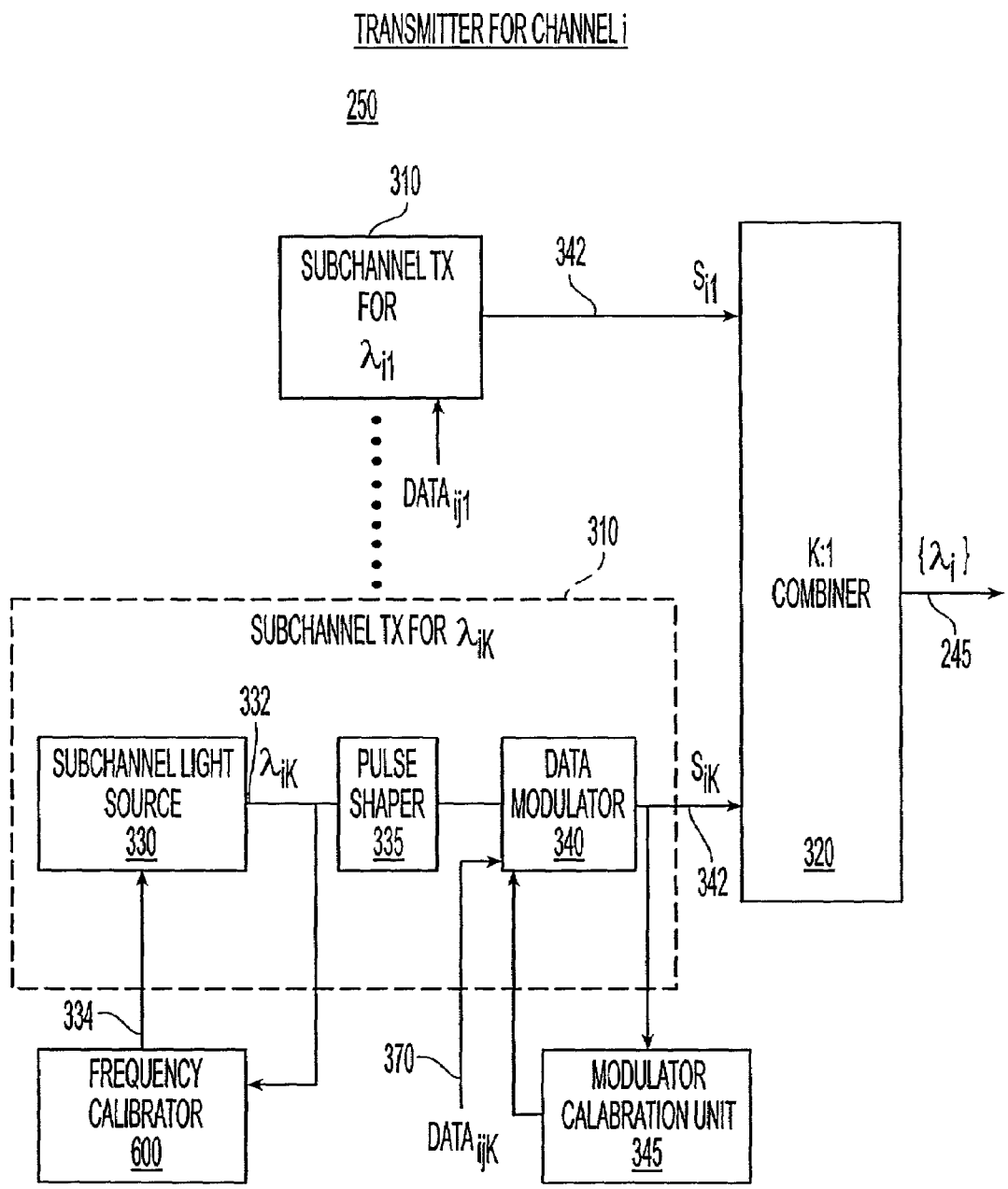
FIG. 3a is a block diagram of a first embodiment of a transmitter in accordance with the present invention.

FIG. 3a is a block diagram of a transmitter 250 in one embodiment of the present invention. The indices used to describer the transmitter in FIG. 3a correspond to a transmitter for channel i. The transmitter 250 comprises a total of K subchannel transmitters 310, each of which outputs a data-modulated subchannel signal $s_{ik}$, where 'k' refers to the index of the subchannel transmitter 310 within transmitter 250 for channel i. A K:1 combiner 320 combines the subchannel signals 342 from the K subchannel transmitters into the channel signal 245, $\{\lambda_i\}$. Each subchannel transmitter 310 includes a subchannel light source 330 and a data modulator 340.

The subchannel light source 330 outputs a subchannel light beam 332 having a subchannel wavelength $\lambda_{ik}$. The subchannel light source may be either a continuous wave (CW) light source, or a pulsed light beam. Preferably, the wavelength $\lambda_{ik}$ of the light source 330 is monitored by a frequency calibrator 600 that controls the light source 330 using a frequency calibration control signal on control line 334. In a preferred embodiment, the K subchannel light sources 330 for channel i are controlled by a single frequency calibrator 600 to generate light beams that are evenly spaced across the channel bandwidth. For example, in an embodiment where K=16 and the channel bandwidth for channel i is 100 GHz, the frequency calibrator controls the K subchannel light sources to generate the K light beams with a 6.25 GHz frequency spacing between each adjacent subchannel.

The K subchannel light sources 330 for a single channel transmitter 250 may comprise K discrete lasers, each of which is individually and independently controlled by the frequency calibrator 600. Alternatively, K subchannel light sources 330 may be implemented using a single laser whose output is split and shifted, as needed, to create the K individual subchannel wavelengths $\lambda_{ik}$. In this latter implementation, a single frequency calibrator controls the output of the single laser and thereby calibrates all subchannel wavelengths $\lambda_{ik}$ simultaneously in a non-independent manner. Regardless of the nature of the light source 330, the subchannel light beam 332 is ultimately directed into a data modulator 340 where the light beam is modulated by data 370 to produce the subchannel signal 342.

Optionally, the subchannel light beam 332 may be subjected to a pulse shaper 335, which may help optimize the pulse shape for minimum overall distortion. The pulse shaper 335 itself may be implemented as a Mach-Zehnder optical device under control of a transmitter processor (not shown). The resulting pulse shape may belong to a predetermined set of shapes, the particular one chosen at any given time being based on channel condition information obtained through out-of-band signaling. Alternatively, an arbitrary pulse shape may be adaptively generated based on the channel condition information. It is therefore contemplated that not only are predetermined pulse shapes, such as Gaussian, symmetric solitons, and the like, possible, but also a host of other empirically derived ones, as well. In this manner, the spectral shape, duty cycle and other factors may be adjusted to suit channel conditions.

A modulator calibration unit 345 may be used to help ensure that the energy in the modulated signals $\lambda_{ik}$ is substantially even among the K subchannels. The modulation calibration unit measures the optical energy output from each of the data modulators 340, and provides feedback to the data modulators so as to ensure that all K subchannels have substantially similar intensities and also ensure that the members of the constellations are orthogonal and balanced. In one sense, then, the modulator calibration unit acts as a power balancer. In a preferred embodiment each of N channels has a single calibration unit 345 that takes into account only the K subchannels, and this is implemented with the help of a processor, or the like. It is understood, however, that a single modulator calibration unit may likewise be employed to serve all N channels, given sufficient processing power. The modulator calibration unit preferably includes optical detectors which receive input from the channel signal 342 output by the data modulator, along with circuitry to convert the detected optical signals into digital form, and a processor to perform any needed calculations and output control signals back to the data modulator.

Figure 3B:
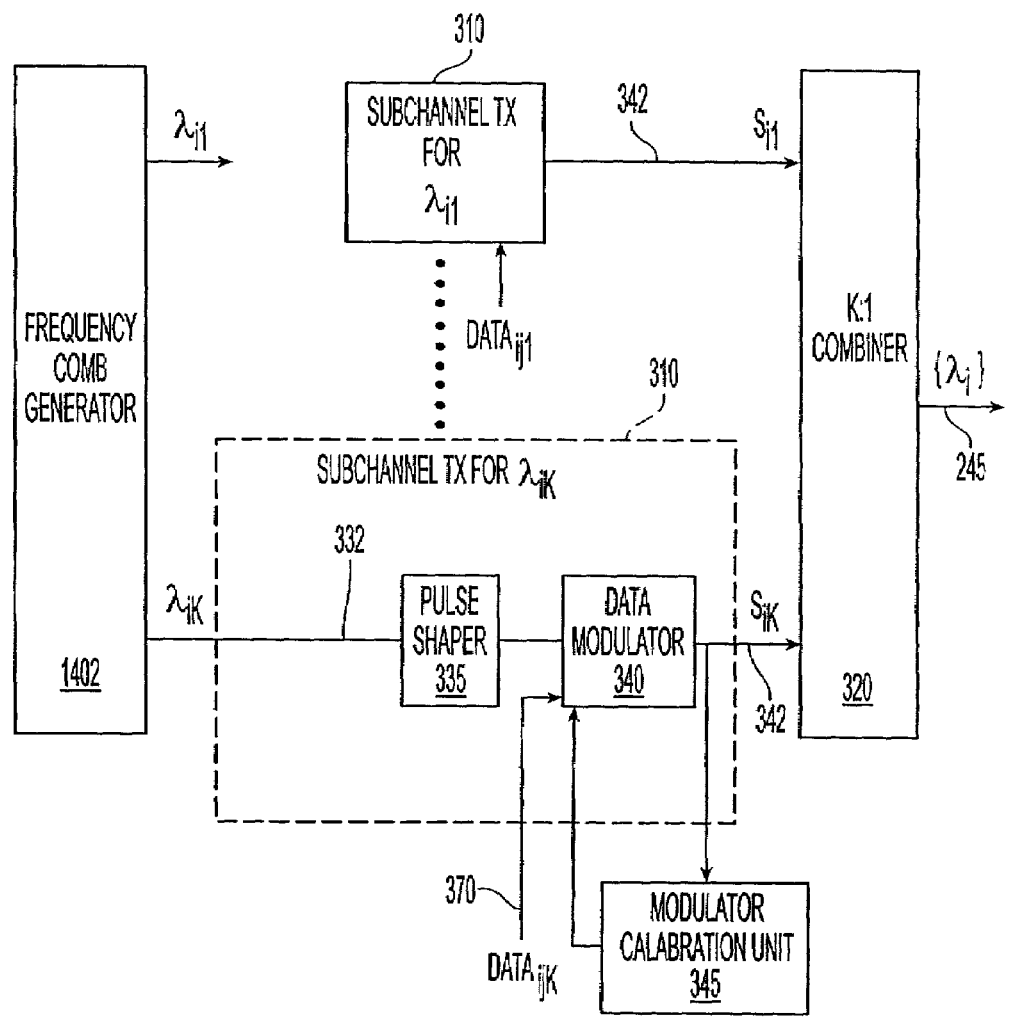
FIG. 3b is a block diagram of a second embodiment of a transmitter in accordance with the present invention.

FIG. 3b is a block diagram of a second embodiment of a transmitter 1400. The transmitter 1400 employs a single light source 1402 that puts out a plurality of evenly spaced-apart spectral lines, separated by some frequency spacing $\Delta f$. Preferably, the single light source 1402 puts out K such spectral lines, each being used as a subchannel light beam 332. This allows one to employ a single light source 1402 to provide the illuminating beam. The evenly spaced-apart spectral lines in the frequency domain, may be regarded as the teeth of a "comb", and so such a light source may be referred to as a 'comb generator'. U.S. Pat. No. 4,096,448 to Hayes and U.S. Pat. No. 5,347,525 to Fans, whose contents are incorporated to the extent necessary to understand the present invention, exemplify systems for creating optical signals having evenly spaced-apart frequencies.

In the transmitter 1402 of FIG. 3b, the comb generator 1402 preferably includes circuitry to ensure even frequency spacing between the teeth. Such circuitry therefore effectively serves to calibrate the teeth output by the comb generator. The output of the comb generator 1402 may then be subject to a pulse shaper 335 and then modulated with data, in each of the sub-channel transmitters.

Data Modulator

Figure 4:
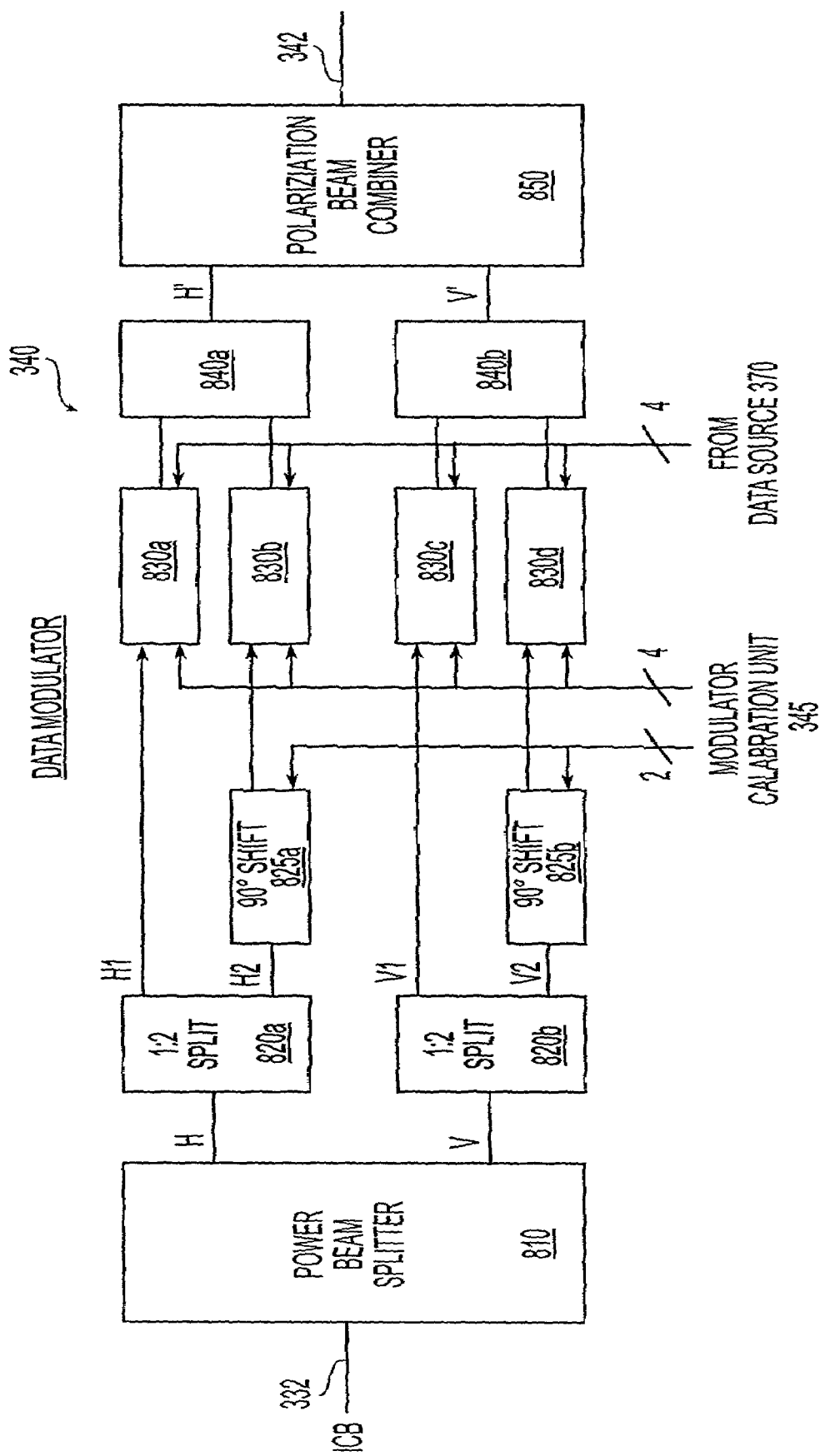
FIG. 4 is a block diagram of the data modulator used in the transmitter shown in FIG. 3a & 3b.

FIG. 4 is a block diagram of a preferred embodiment of a data modulator 340 of the sort used in the subchannel transmitters seen in FIGS. 3a and 3b. An incoming subchannel light beam 332 from the subchannel light source 330 enters the data modulator 340 through a power splitter 810. The power splitter 810 splits incoming beam 332 into two beams, designated as H and V. The H and V beams are each directed into separate 1:2 splitters 820a, 820b, although a 1:4 splitter may be used instead. The splitter 820a splits the H beam into H1 and H2 components and directs one of these (H2 in FIG. 8), into a 90° phase shifter 825a. Similarly, the splitter 820b splits the V beam into V1 and V2 components and directs one (V2 in FIG. 8) into a 90° phase shifter 825b.

Each of the four component beams are directed into a separate modulator 830a, 830b, 830c, 830d where the data stream 370 is modulated on the four component beams. As discussed above, the data stream $DATA_{ijk}$ includes data to be encoded on the H and V polarizations of a single code word, depending on the index 'j'. Thus, the data input to modulators 830a, 830b is the data corresponding to j='H' and the data input to modulators 830c, 830d is the data corresponding to j='V'.

Control signals from a modulation calibration unit 345 ensure that the intensity of each data-modulated component beam is comparable to that of the others and ensures the orthogonality of the in-phase and quadrature components of the constellation. Thus, the modulation calibration unit may have inputs into one or both of the phase shifters 825a, 825b and the data modulators 830a, 830b, 830c, 830d.

In a preferred embodiment, each of the four component beams is modulated with one bit. The modulators 830a, 830b, 830c, 830d are each implemented as a Mach-Zehnder Interferometer (MZI), each applying an amplitude of 1 or −1 (0° or 180° phase shift) to the component beam depending on whether the bit state is a 0 or 1. In a preferred embodiment, the data is encoded in the changes of phase between one bit to the other, referred to as differential quadrature phase shift keying (DQPSK). As will be clear to one of skill in the art, the 90° shift may be applied after the bit modulator 830. As will also be clear to one of skill in the signal processing arts, the modulator 830 may also be a phase modulator or a multilevel amplitude modulator thereby allowing any amplitude/phase modulation and encoding of a higher number of bits per symbol.

The modulated H1 and H2 component beams are combined in a first combiner 840a to form a data-modulated beam H'. Similarly, the modulated V1 and V2 component beams are combined in a second combiner 840b to form a data modulated beam V'. The data-modulated beams H' and V' are then combined in a polarization beam combiner 850 that rotates the polarization plane of the H'-beam 90° to the polarization plane of the V'-beam and combines both beams into the data beam 342. The combined H' and V' beams do not interfere because of their orthogonal polarization planes.

As will be clear to one of skill in the optical arts, the polarization state of H' and V' beams may also be converted to any two orthogonal polarizations (such as right circularly polarized beam and a left circularly polarized beam) before combining into the data beam and still maintain the orthogonality condition that prevents interference between the two beams. As will also be clear to one of skill in the optical signal processing arts, the bit modulators 830a, 830b, 830c and 830d may also be implemented as a phase modulator or a multilevel amplitude modulator, thereby allowing higher bits per symbol.

Channel Receiver with Fully Digital PMD Compensation

Figure 5A:
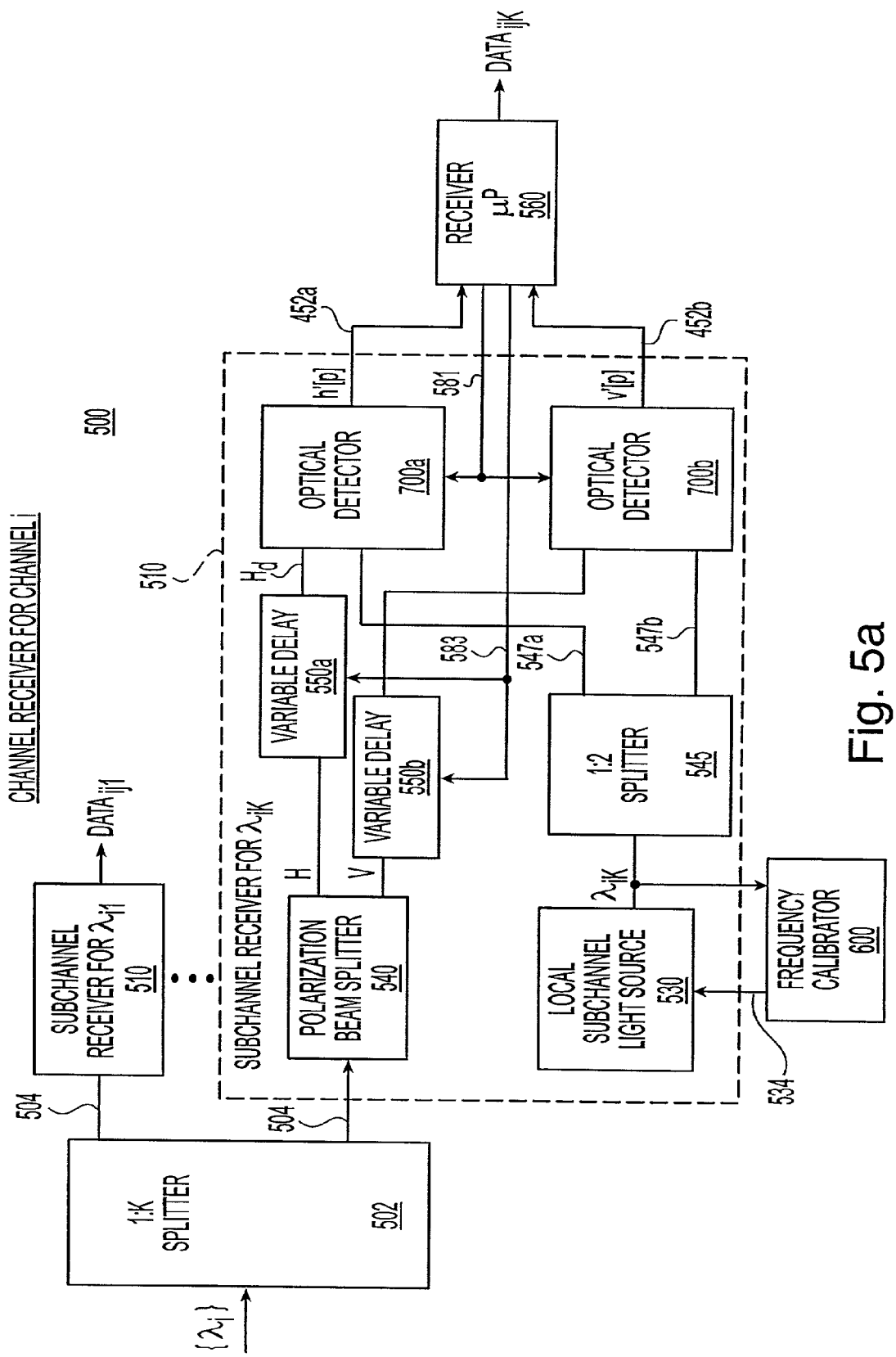
FIG. 5a is a block diagram of a one embodiment of the receiver shown in FIGS. 2a and 2b.

FIG. 5a is a block diagram of a first embodiment of a channel receiver 500, of the sort that can be used as the receiver 260 in FIGS. 2a & 2b. The nomenclature used to describe receiver 500 corresponds to a receiver for channel i.

The channel signal $\{\lambda_i\}$ from the DWDM demultiplexer 230, which carries K subchannel signals each having a data stream with both H and V components, is directed into a 1:K receiver splitter 502 that splits the optical channel signal into K identical receiver channel signals 504. Each of the identical receiver channel signals 504 is input to one of K subchannel receivers 510, each subchannel receiver 510 being configured to detect one subchannel $\{\lambda_{ik}\}$. For purposes of clarity, only one subchannel receiver 510 is shown in detail in FIG. 5a.

The receiver channel signal 504 is first directed into a polarization beam splitter 540 which splits the incoming signal into two orthogonal components, designated 'H' and 'V'. The H- and V-components are subjected to variable delays 550a, 550b to form delayed component $H_d$, $V_d$, respectively. Both components are subjected to delays since it may not be known in advance which of the two, if any, is ahead of the other and the so the delay assists in timing synchronization between the two. The delayed H-component $H_d$ is directed as a first input into a first optical phase detector 700a while the V-component $V_d$ is directed as a first input into a second optical phase detector 700b.

A local subchannel light source 530 is configured to output a reference signal having a subchannel wavelength, $\lambda_{ik}$. The subchannel light source 530 preferably is implemented in the same manner as the subchannel light source 330 associated with the transmitter seen in FIG. 3a. More preferably, the same unit 330 is used since the transmitter and receiver are co-located. A frequency calibrator 600 is thus also used to output a frequency calibration control signal 534 to control the local subchannel light source 530.

The output from the local subchannel light source 530 is input to a 1:2 splitter 545 to thereby output two identical reference signals 547a, 547b. Of these, reference signal 547a is directed as a second input to the first optical phase detector 700a, while reference signal 547b is directed as a second input to the second optical phase detector 700b. And since channel receiver 500 mixes the incoming signal with a local reference signal which preferably is at the same frequency, channel receiver 500 can be considered to be a homodyne receiver.

The optical detector 700a combines the delayed H-component $H_d$ with reference signal 547a and outputs a digitized electrical signal 452a, indicated as h'[p] in FIG. 5a. Similarly, optical detector 700b combines the V-component with reference signal 547b and outputs a digitized electrical signal 452b, indicated as v'[p] in FIG. 4a. Digital electrical signals 452a and 452b each include the separate I and Q components. The 'prime' notation for h'[p] and v'[p] indicates that the digitized signals 452a, 452b are uncompensated for any polarization distortion and the 'p' refers to an index in a continuum of digitized signals.

The digitized electrical signals 452a, 452b are then input to a digital processor 560 associated with the receiver for further processing. The processor may be realized by a general purpose microprocessor, an FPGA, an ASIC, a specialized RISC architecture, or the like. Regardless of how the processor is implemented, it is configured to perform a number of tasks including data demodulation, symbol timing recovery, and PMD compensation, which in the embodiment of FIG. 5a is completely by digital manipulation of the signals. Each of these is implemented as some combination of hardware, firmware and/or software modules associated with the processor.

Figure 5B:
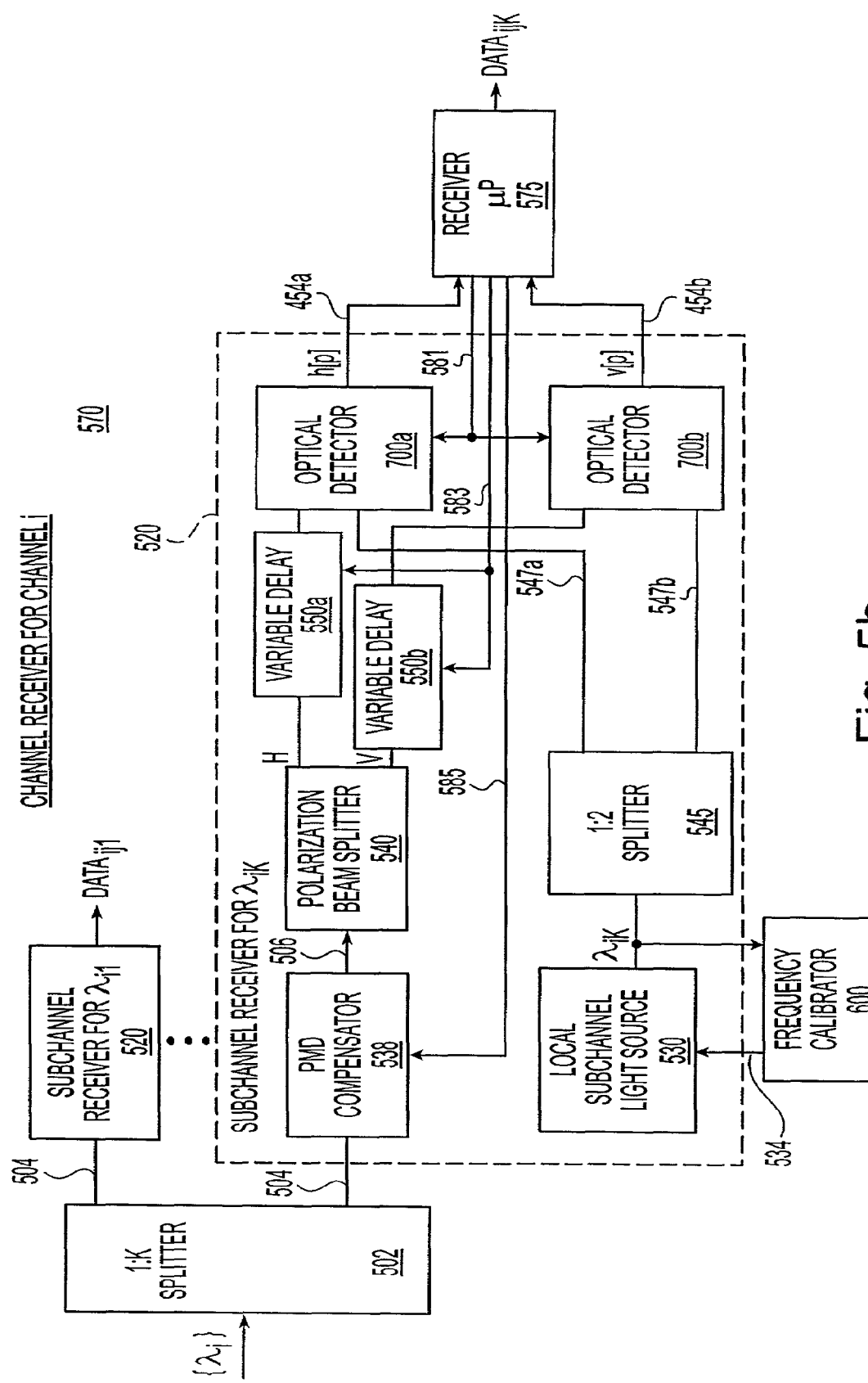
FIG. 5b is a block diagram of another embodiment of the receiver shown in FIGS. 2a and 2b.
Figure 5C:
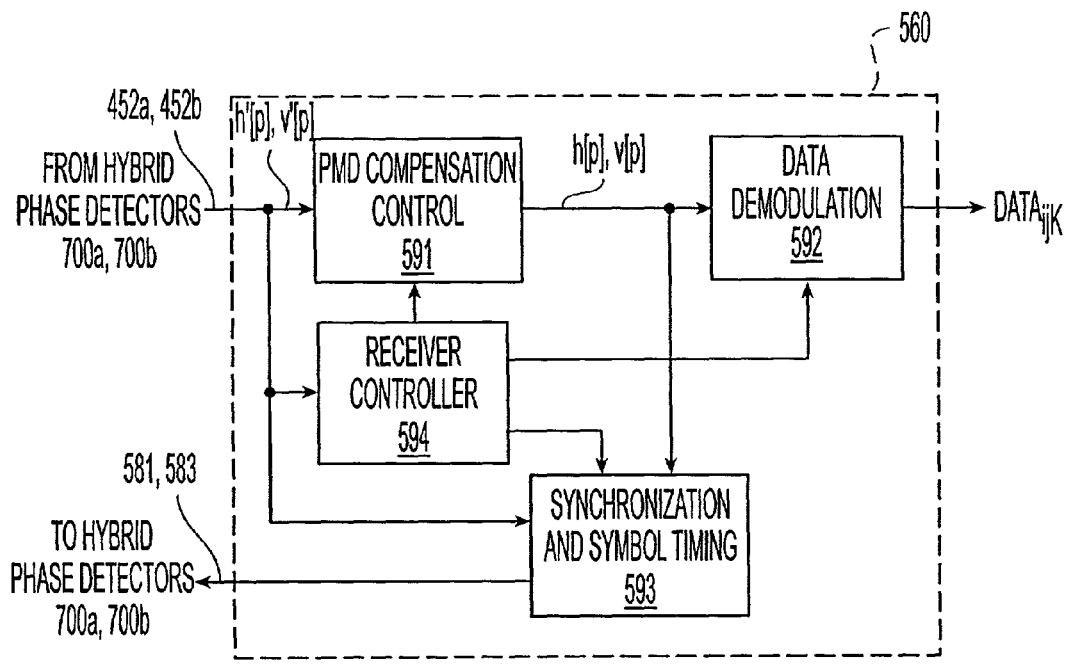

FIG. 5c shows a functional diagram of the some of the critical processing performed by the processor 560.

With regard to PMD compensation, the processor 560 is provided with a PMD compensation module 591 which monitors incoming first and second digital signals 452a, 452b (h'[p] & v'[p]) and internally produces the PMD-compensated first and second digital signals h[p] & v[p] therefrom. In principle, the processor 560 digitally aligns the SOP of the received signal to the SOP of the transmitted signal. This is performed by a rotation operation given by the matrix equation $$R[p] = \underline{T} R'[p] \tag{1}$$

where $$R'[p] = (v'[p] h'[p])^T \tag{2}$$

$$R[p] = (v[p] h[p])^T \tag{3}$$

$\underline{T}$ is a 2×2 rotation matrix, the superscript T represents the transpose and h[p] and v[p] (without the 'prime') represent the compensated digitized electrical signals. Preferably, this calculation is done digitally within the processor 560.

With regard to data demodulation, the processor 560 is provided with a data demodulation module 592. The data demodulation module uses the internal polarization-compensated digital signals h[p] and v[p] to recover the data which modulated the subchannel wavelength, $\lambda_{iK}$. The receiver then outputs the subchannel data stream $Data_{ijK}$.

The data demodulation module 592 also incorporates a frequency offset compensator. As discussed above, the subchannel receiver 520 uses a local reference laser 530 to convert the optical signal into the electrical domain. The frequency difference between the incoming carrier signal and the local reference laser 530 produces cross talk between the in-phase and quadrate components in the subchannel receiver and degrade the phase detection. To minimize degradation due to this frequency error, the laser source at the transmitter and receiver have to be tightly calibrated. The calibration requirements can be relaxed if the residual carrier frequency error is compensated for down in the receiver chain. This may potentially allow one to use a simpler system with respect to ensuring identical transmitter and receiver frequencies.

Thus, two approaches to transmitter/receiver frequency correspondence may be achieved—the first approach using a frequency calibration unit 600 described below, and the second approach using a frequency offset compensator associated with data demodulator module 592. This second approach helps mitigate additional frequency offsets that may affect the transmitted signal as it propagates through the channel. Under certain conditions, it is contemplated that one may be able to altogether do away with the frequency calibration circuit, and use only the frequency offset compensator.

The frequency offset compensator within the data demodulator module 592 estimates the frequency error and performs the compensation either by rotating the received waveform, or, in case of the differentially encoded signal, by shifting the signal phase (or biasing the decision boundary). Depending on the modulation format, maximum allowable frequency offset, noise level, etc., an appropriate frequency offset estimation algorithm can be chosen from among the standard algorithms known to those skilled in the art. U.S. Pat. No. 5,245,611, whose contents are incorporated by reference, discloses such an algorithm which may be readily adapted from the wireless domain to the optical domain. In a preferred embodiment, a decision-directed frequency estimation and phase shift compensation algorithm is employed.

With regard to symbol timing recovery, the processor 560 is provided with a symbol timing recovery module 593 that monitors the digital signals 452a, 452b, and also their internal PMD-compensated versions h[p] and v[p], and outputs a suite of optical detector control signals, represented by 581 to the optical detectors 700a, 700b. The suite of control signals 581 is used for symbol timing recovery, synchronization of analog and digital components, and the like. Included among these control signals are timing signals to control the sampling of the optical detectors. The optical detectors 700a, 700b require these signals to indicate the data symbol temporal boundaries in the optical channel signal. If the timing signal is not aligned to the symbol boundary, the detected signal will include additional noise from the other subchannels thereby increasing the bit error rate of the signal (it would also include inter-symbol interference noise). The normalized timing error, τ, is the difference between the timing signal that begins the sampling in the optical detector 700a, 700b and the actual symbol boundary in the optical channel signal divided by the symbol period.

The processor 560 also outputs a clock signal 583 to control the variable delays 550a, 550b. While in FIG. 5a, the clock signal is shown as coming directly from the processor 560, it may instead be created by a separate device, perhaps controlled by the processor 560.

A receiver controller module 594 supervises the operation of some of the other modules in processor 560.

Channel Receiver with Driver for Mechanical Polarization Compensation

FIG. 5b is a block diagram of a second embodiment of a channel receiver 570 of the sort that can be used for receiver 260 of FIGS. 2a and 2b. The channel receiver 570 includes K subchannel receivers 520 which have slightly different construction than subchannel receivers 510 seen in FIG. 5a. However, channel receiver 570 also mixes the incoming signal with a local reference signal which preferably is at the same frequency, and so channel receiver 570 can also be considered to be a homodyne receiver.

The channel signal, $\{\lambda_i\}$, from the DWDM demultiplexer 230 is directed to the 1:K receiver splitter 502 that splits the optical channel signal into K identical receiver channel signals 504, each of which is directed into a subchannel receiver 520. For purposes of clarity, only one subchannel receiver 520 is shown in detail in FIG. 5b.

The channel signal, $\{\lambda_i\}$, entering the subchannel receiver 520 is first directed to an optical PMD compensator device 538 (RX PC) and is modified into a polarization-compensated beam 506. The PMD compensator 538 adjusts the SOP of the channel signal $\{\lambda_i\}$ to align the received signal's SOP to the SOP of the transmitted signal and thereby compensate for PMD distortion caused by the transmitting medium such as the optical fiber. The PMD compensator 538, in one embodiment, is the Acrobat™ Polarization Control Module (PCM) from Corning Incorporated of Corning, N.Y. The PolarRITE™II Polarization Controller from General Photonics Corporation of Chino, Calif. may also be used as the PMD compensator 538.

The polarization-compensated beam 506 is first directed into a polarization beam splitter 540 that splits the incoming signal into two orthogonal components, designated 'H' and 'V'. The H-component is directed as a first input into a first optical phase detector 700a while the V-component is directed as a first input into a second optical phase detector 700b.

A local subchannel light source 530 is configured to output a reference signal having a subchannel wavelength, $\lambda_{iK}$. The subchannel light source 530 preferably is implemented in the same manner as the subchannel light source 330 associated with the transmitter seen in FIG. 3a and, more preferably, is the same unit since the transmitter and receiver are co-located. A frequency calibrator 600 is thus also used to output a frequency calibration control signal 534 to control the local subchannel light source 530.

The output from the local subchannel light source 530 is input to a 1:2 splitter 545 to thereby output two identical reference signals 547a, 547b. Of these, reference signal 547a is directed as a second input to the first optical phase detector 700a, while reference signal 547b is directed as a second input to the second optical phase detector 700b.

The optical detector 700a combines the H-component with reference signal 547a and outputs a digitized electrical signal 454a, indicated as h[p] in FIG. 5b. Similarly, optical detector 700b combines the V-component with reference signal 547b and outputs a digitized electrical signal 454b, indicated as v[p] in FIG. 5b. Digital electrical signals 454a and 454b each include the separate I and Q components. By virtue of the effect of the PMD compensator 538, the signals h[p] and v[p] (which do not include the 'prime' notation) are the polarization-compensated data modulated digital signals, with 'p' referring to an index in a continuum of digitized signals.

The digitized electrical signals 454a, 454b are then input to a digital processor 575 associated with the receiver 570 for further processing. The processor 575 may be realized by a general purpose microprocessor, an FPGA, an ASIC, a specialized RISC architecture, or the like. Regardless of how the processor 575 is implemented, it is configured to perform a number of tasks including data demodulation, symbol timing recovery, and PMD compensation control with the optical compensation being performed by a physical device. Each of these is implemented as some combination of hardware, firmware and/or software modules associated with the processor.

Figure 5D:
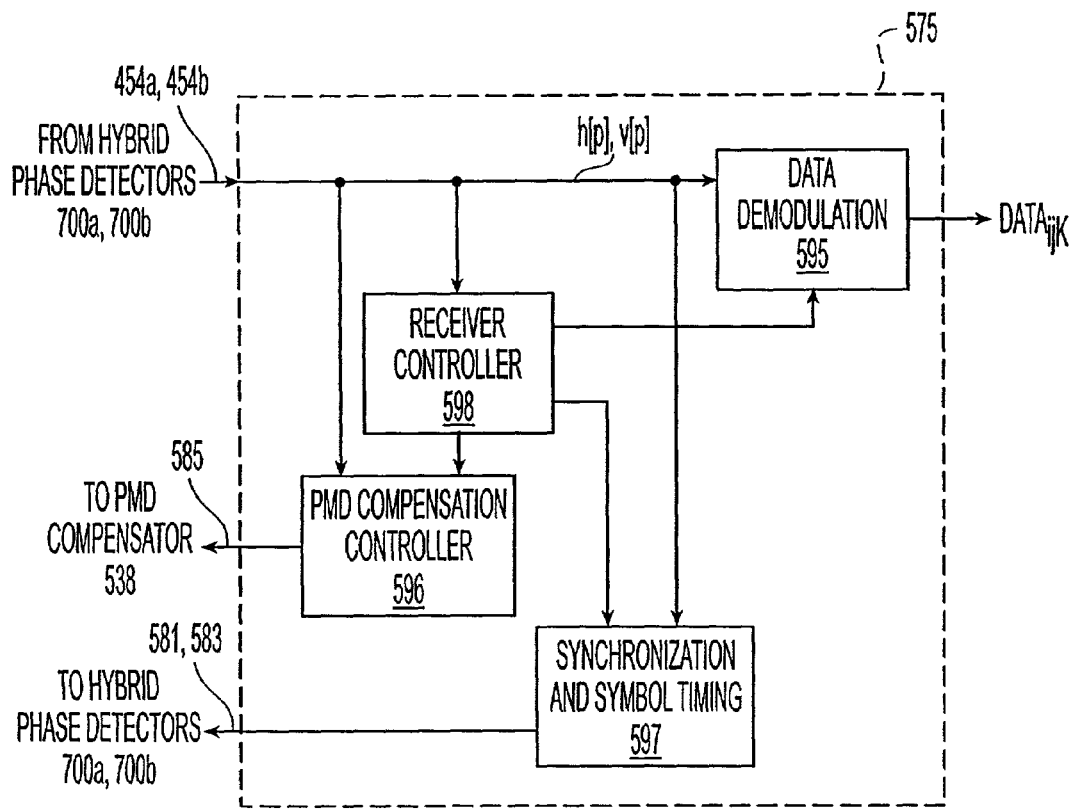
FIG. 5d is a functional diagram of the receiver processor seen in FIG. 5b.

FIG. 5d shows a functional diagram of the some of the critical processing performed by the receiver processor 575.

With regard to data demodulation, the processor 575 is provided with a data demodulation module 595 that monitors the PMD-compensated digitized signals 454a, 454b and recovers the data that modulated the subchannel wavelength $\lambda_{ik}$ The receiver 575 then outputs the subchannel data stream Data$_{ijK}$. The data demodulation module 595 in receiver processor 575 also incorporates a frequency offset compensator, much along the lines described above with respect to the one in receiver processor 560.

With regard to PMD compensation, the receiver is provided with a PMD compensation control module 596 that monitors the digitized signals 454a, 454b and generates PMD device control signals 585 that are provided to the PMD compensator 538 based on these signals. The PMD compensation control module continually adjusts the channel signal's SOP through the PMD compensator 538 to find and track the optimum adjustment for the PMD compensator 538. The criteria for optimum adjustment of the PMD compensator 538 may be based on maximizing the SNR of the digitized signals 454a, 454b or other such criteria known to those skilled in the art of optical signal processing.

With regard to symbol timing recovery, the receiver processor 575 is provided with a symbol timing recovery module 597 that monitors the polarization-compensated digitized signals 454a, 454b and outputs a suite of optical detector control signals 581 to the optical detectors 700a, 700b. The suite of control signals 581 is used for symbol timing recovery, synchronization of analog and digital components, and the like. Included among these control signals are timing signals to control the sampling of the optical detectors. The optical detectors 700a, 700b require these signals to indicate the data symbol temporal boundaries in the optical channel signal. If the timing signal is not aligned to the symbol boundary, the detected signal will include additional noise from the other subchannels thereby increasing the bit error rate of the signal (it would also include inter-symbol interference noise). The normalized timing error, τ, is the difference between the timing signal that begins the sampling in the optical detector 700a, 700b and the actual symbol boundary in the optical channel signal divided by the symbol period. For the receiver processor 575, the symbol timing recovery module preferably is implemented as a Mueller & Muller timing error detector module, discussed below.

The processor 575 also outputs a clock signal 583 to control the variable delays 550a, 550b. While in FIG. 5b, the clock signal is shown as coming directly from the processor 575, it may instead be created by a separate device, perhaps controlled by the processor 575

Finally, a receiver controller module 598 supervises the operation of the other modules in processor 575.

Self-Homodyne Sub-Channel Receiver

The sub-channel receivers 510, 520 described above utilize a local subchannel light source 530, and so may be regarded as 'heterodyne' if the transmit and receive frequencies of the lasers are different and 'homodyne' if they are the same of close to one another. As discussed above, one difficulty with such receivers is the problem of frequency offset between the transmitter light source and the receiver light source. One way to obviate the problem of frequency offset is to use a self-homodyne subchannel receiver which does not need a local subchannel light source.

Figure 11A:
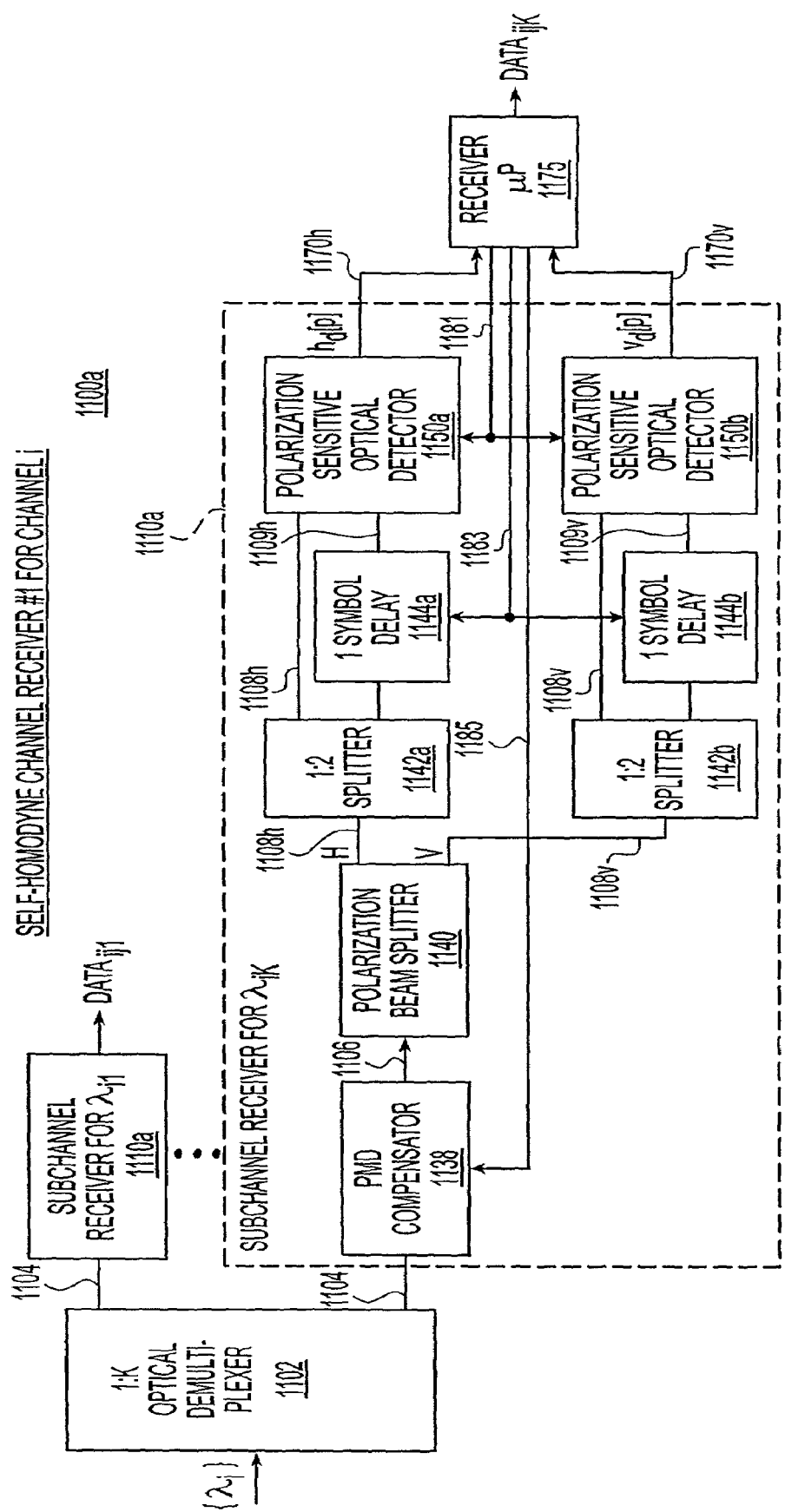
FIG. 11a shows a first embodiment of a self-homodyne optical communication receiver in accordance with the present invention.
Figure 11B:
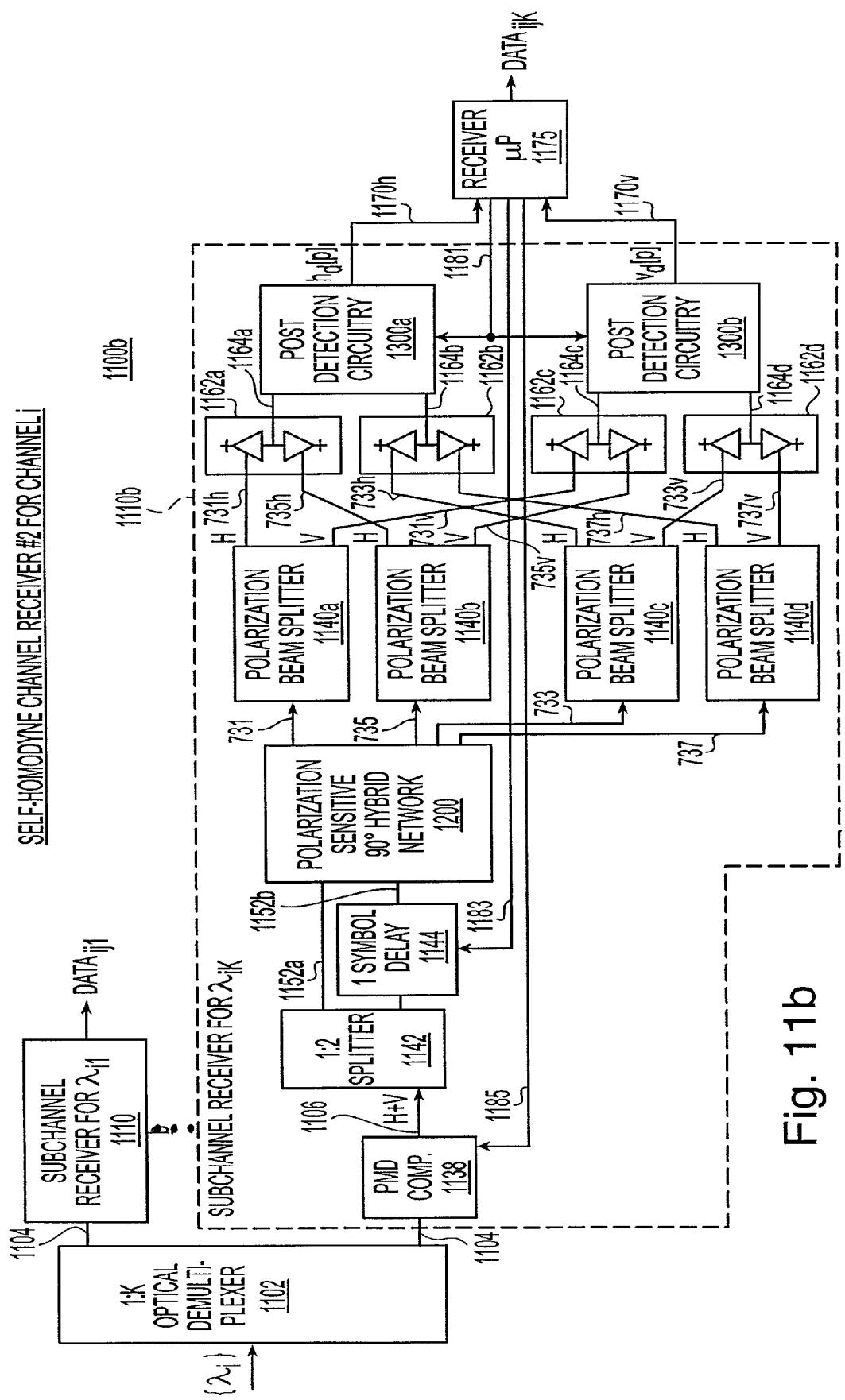
FIG. 11b shows a second embodiment of a self-homodyne optical communication receiver in accordance with the present invention.
Figure 11C:
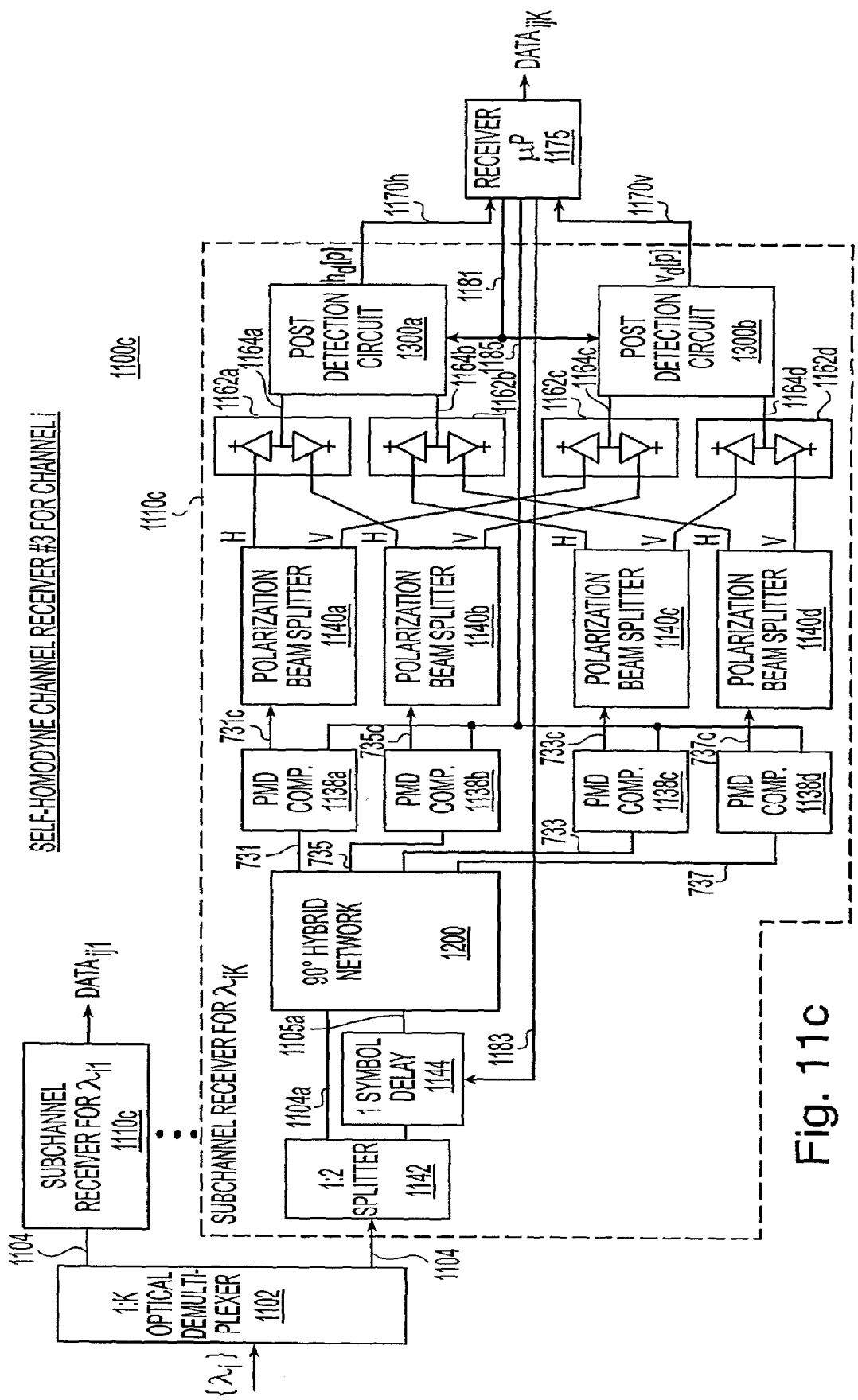
FIG. 11c shows a third embodiment of a self-homodyne optical communication receiver in accordance with the present invention.
Figure 12:
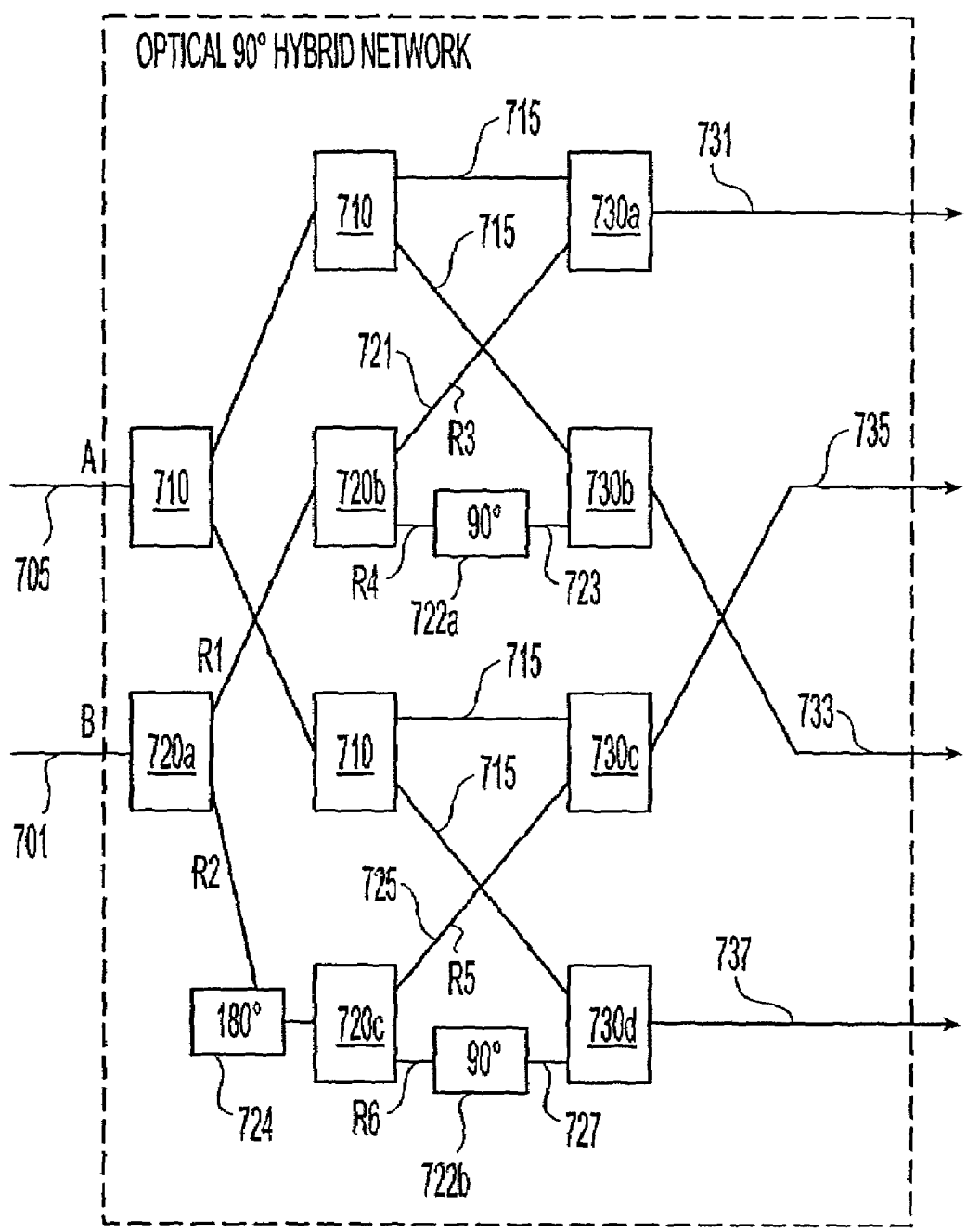
FIG. 12 shows an optical hybrid network circuit which receive two input signals and outputs four combined complex signals.

FIGS. 11a, 11b and 11c show different embodiments of self-homodyne receivers 1100a, 1100b, 1100c in accordance with the present invention. The self-homodyne receivers 1100a, 1100b, 1100c each include a 1:K optical demultiplexer 1102 which receives the multi-frequency channel signal $\{\lambda_l\}$ and outputs the K individual sub-channel signals $\{_{lk}\}$, shown on signal path 1104. The optical demultiplexer 1102 thus performs the equivalent of optically splitting the multi-frequency channel signal into K separate paths and then employing an optical filter attuned to a particular frequency in each of those paths. Each of the self-homodyne receivers 1100a, 1100b, 1100c comprises K self-homodyne sub-channel receivers 1110a, 1110b, 1110c, respectively. Since all of the self-homodyne sub-channel receivers for any given self-homodyne receiver 1100a, 1100b, 1100c are the same, only one of each is described herein.

Figure 1:
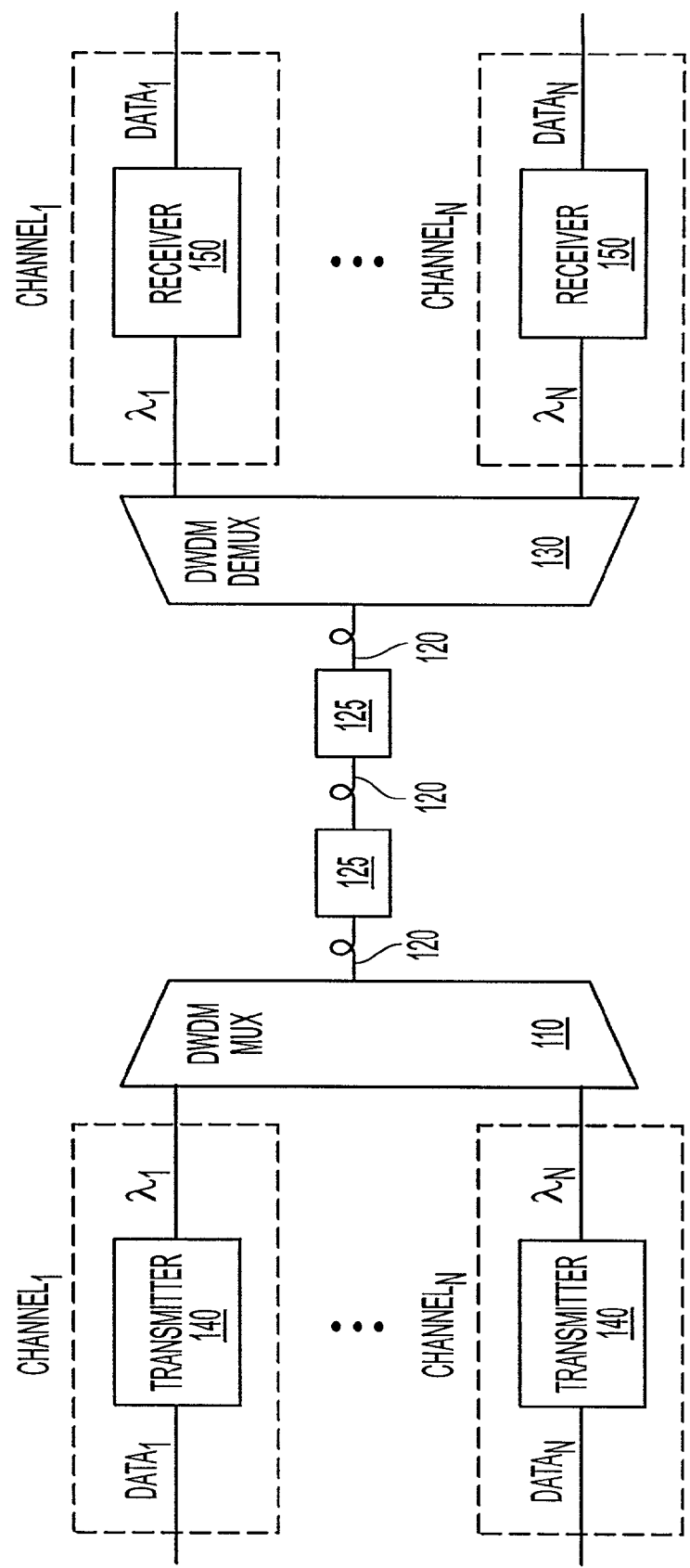
FIG. 1 is a block diagram of a simplex prior art DWDM system architecture.

FIG. 11a shows a first embodiment of a self-homodyne sub-channel receiver system. This self-homodyne embodiment has a single PMD compensator and a single polarization beam splitter. As seen in FIG. 1a, the sub-channel signal 1104 is input to a PMD compensator device 1138 in self-homodyne sub-channel receiver 1110a, resulting in a PMD-compensated signal 1106. PMD compensator device 1138 is controlled by control signals 1185 from the receiver processor 1175, not unlike the sub-channel receiver 520 described above. The PMD-compensated signal 1106 is then input to a polarization beam splitter 1140 which outputs the H- and V-polarized signals 1108h, 1108v, respectively.

The H-polarized signal 1108h is input to 1:2 splitter 1142a to produce two identical H-polarized signals 1108h, one of which is delayed by a one-symbol delay 1144a to produce a delayed H-polarized signal 1109h. The H-polarized signal 1108h and the delayed H-polarized signal 1109h are then input to a polarization-sensitive optical detector 1150a outputting h$_d$[p] as signal 1170h. h$_d$[P] comprises a digital output signal representative of both the I and Q components of phase and/or amplitude difference between corresponding bits of information in successive symbols encoded on H polarization at the transmitter.

The V-polarized signal 1108v is subject to a similar treatment, being passed through 1:2 splitter 1142b, one output of which is subjected to delay 1144b to produced delayed V-polarized signal 1109v. Delayed V-polarized signal 1109v and V-polarized signal 1108v are input to a polarization-sensitive optical detector 1150b which outputs V$_d$[p] as signal 1170v. V$_d$[p] comprises a digital output signal representative of both the I and Q components of phase and/or amplitude difference between corresponding bits of information in successive symbols encoded on V polarization at the transmitter.

As is known to those skilled in the art, a polarization sensitive device is one having optical circuitry that preserves the polarization of an optical signal input thereto. This is usually achieved through selection of specific materials, such as lithium niobate, $LiNbO_3$, which are particularly well-suited for this purpose. Thus, while the optical circuitry of a polarization-sensitive and polarization-insensitive device may be similar, the material used to form the crystal supporting the waveguides and other structures may differ.

The receiver processor 1175 provides much of the same functionality as receiver processor 575. Thus, receiver processor 1175 includes analogous modules and also outputs optical detector control signals 1181, symbol delay signals 1183 and PMD device control signals 1185. One significant difference, however, is in the nature of the data demodulation module associated with receiver processor 1175. Since the signals 1170h, 1170v are differential data, such as from DPSK modulation, the data demodulation module associated with receiver processor 1175 treats these data differently than does data demodulation module 595 associated with receiver processor 575.

FIG. 11b presents the second embodiment of a self-homodyne receiver 1100b having self-homodyne sub-channel receivers 1110b. This self-homodyne embodiment has a single PMD compensator and multiple polarization beam splitters. In self-homodyne sub-channel receiver 1110b, The sub-channel signal 1104 is input to a PMD compensator device 1138, resulting in a PMD-compensated signal 1106. Again, the PMD compensator device 1138 is controlled by control signals 1185 from the receiver processor 1175. The PMD-compensated signal 1106 is then input to 1:2 splitter 1142 to produce two identical PMD-compensated signals 1152a, one of which is delayed by a one-symbol delay 1144 to produce a delayed PMD-compensated signal 1152b.

The PMD-compensated signal 1152a and the delayed PMD-compensated signal 1152b are then input to a polarization-sensitive 90° optical hybrid circuit 1200 which outputs four combined signals 731, 735, 733 and 737, discussed further below with respect to the optical 900 hybrid detector 799 seen in FIG. 7. The polarization-sensitive 90° optical hybrid circuit 1200 is similar to the optical 90° hybrid detector 799, but does not include the two pairs of matched photodiodes. The four combined signals 731, 733, 735 and 737 represent the four complex cross-components of the PMD-compensated signal 1152a and the delayed PMD-compensated signal 1152b.

The four combined signals 731, 735, 733 and 737 are input to respective polarization beam splitters 1140a, 1140b, 1140c and 1140d, respectively, to produce four corresponding pairs of H- and V-polarized signals designated 731h, 735h, 733h and 737h, and 731v, 735v, 733v and 737v in FIG. 11c.

H-polarized signals 731h and 735h are input to a first matched detector 1162a which includes light sensors, such as photodiodes, to thereby generate analog electrical detection signals 1164a proportional to the intensity difference between the H-polarized signals 731h and 735h. Similarly, H-polarized signals 733h and 737h are input to a second matched detector 1162b to produce analog electrical detection signals 1164b, V-polarized signals 731v and 735v are input to a third matched detector 1162c to produce analog electrical detection signals 1164c and V-polarized signals 733v and 737v are input to a fourth matched detector 1162d to produce analog electrical detection signals 1164d.

Figure 13:
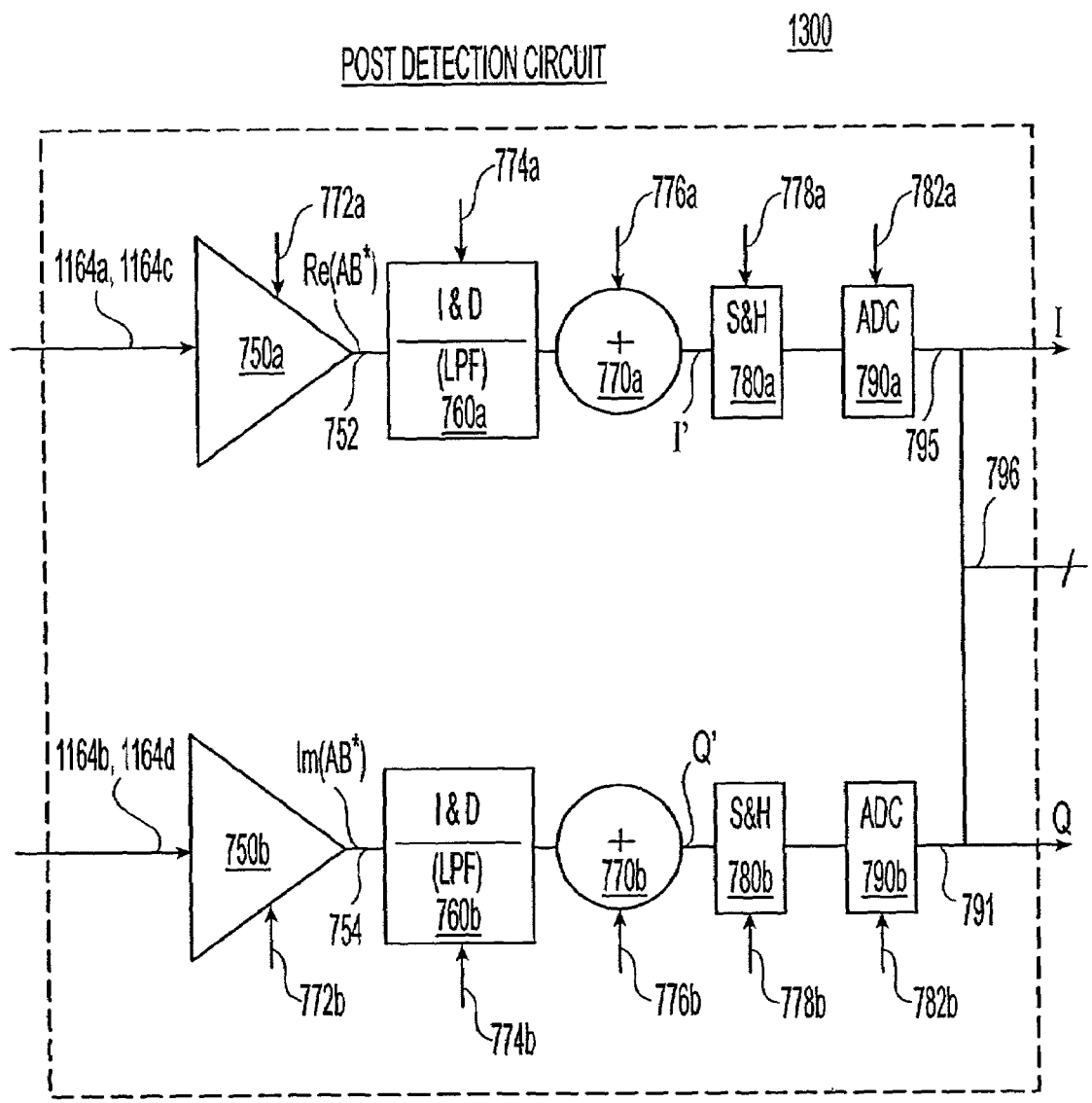
FIG. 13 shows a detection circuit which receives two analog input signals representing in-phase and quadrature components and outputs two corresponding digital signals.

The analog electrical detection signals 1164a, 1164b corresponding to the H-polarization are input to a first post-detection circuit 1300a seen in FIG. 13 as post-detection circuit 1300. First post-detection circuit 1300a outputs $h_d[p]$ as signal 1170h which comprises a digital output signal representative of both the I and Q components of phase and/or amplitude difference between corresponding bits of information in successive symbols encoded on H polarization at the transmitter. Similarly, the analog electrical detection signals 1164c, 1164d corresponding to the V-polarization are input to a second post-detection circuit 1300b which outputs $v_d[p]$ as signal 1170v, and is the V-polarization counterpart.

The receiver processor 1175 in FIG. 11b receives and processes hd[p] and $V_d[p]$ as discussed above, outputting the various control signals 1181, 1183, 1185 and also the data processed by sub-channel receivers 1110b.

FIG. 11c presents the third embodiment of a self-homodyne receiver 1100c having self-homodyne sub-channel receivers 110c. This self-homodyne embodiment has a multiple PMD compensators and multiple polarization beam splitters. In self-homodyne sub-channel receiver 1110c, The sub-channel signal 1104 is first input to a 1:2 splitter 1142 to produce two identical sub-channel signals 1104a, one of which is delayed by a one-symbol delay 1144 to produce delayed sub-channel signal 1105a.

The sub-channel signal 1104a and the delayed sub-channel signal 1105a are input to a 90° optical hybrid circuit 1200 which outputs the four combined signals 731, 735, 733 and 737. The 90° optical hybrid circuit 1200 found in sub-channel receiver 1110c does not have to be polarization sensitive, since it does not receive the polarization beam-split signals. However, it would not hurt to use a polarization-sensitive 90° optical hybrid circuit. The four combined signals 731, 733, 735 and 737 represent the four complex cross-components of the PMD-compensated signal 1152a and the delayed PMD-compensated signal 1152b.

The four combined signals 731, 735, 733 and 737 are each input to a corresponding PMD compensator device 1138a, 138b, 1138c and 1138d, respectively, to form PMD-compensated combined signals 731c, 735c, 733c and 737c, respectively. Each of the PMD compensator devices 1138a, 138b, 1138c and 1138d is controlled by the suite of signals 1185 from the receiver processor 1175, created by the PMD compensation controller module therein.

The four PMD-compensated signals 731c, 735c, 733c and 737c are input to a corresponding polarization beam splitter 1140a, 1140b, 1140c and 1140d, each outputting a pair of signals having first and second orthogonal polarizations. The remainder of the circuitry of the sub-channel receiver 1110c is substantially the same as that of sub-channel receiver 1110b described with respect to FIG. 11b. The receiver processor 1175 in the circuit of FIG. 11c receives and processes $h_d[p]$ and $v_d[p]$ as discussed above, outputting the various control signals 1181,1183, 1185 and also the data processed by sub-channel receivers 1110c.

An optical communications system may employ either of the transmitters 250, 1400 in conjunction with either receivers 500, 570 or the self-homodyne receivers 1100a, 110b, 1100c. This is because the self-homodyne technique of comparing a signal with a one-symbol delayed version of itself does not depend on the nature of the transmitted signal.

Frequency Calibrator

Figure 6:
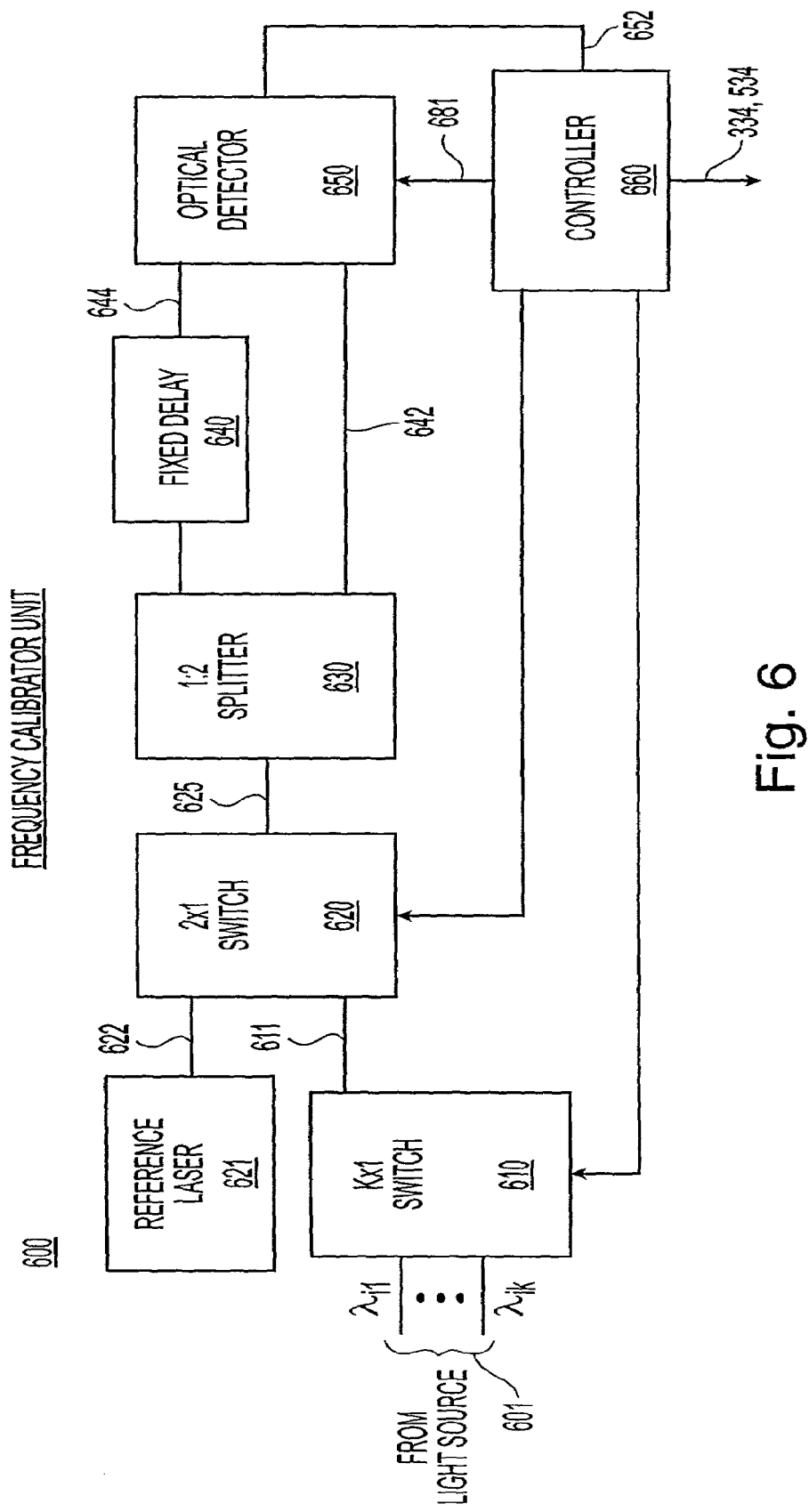
FIG. 6 is a block diagram of the frequency calibrator in a preferred embodiment of the present invention.

FIG. 6 is a block diagram of the frequency calibrator 600 in a preferred embodiment of the present invention. The K light beams, each representing a subchannel frequency $\lambda_{ik}$ from either the transmitter subchannel light source 330 or from the receiver subchannel light source 430 are directed into a K×1 switch 610. The K×1 switch 610 selects one of the subchannel frequencies $\lambda_{ik}$ for calibration and directs the chosen light beam 611 to a second switch 620, which is a 2×1 switch. It should be noted, however, that a K+1:1 switch may be used instead of first and second switches 610, 620. Second switch 620 selects either chosen light beam 611 or reference light beam 622 generated by reference laser 621 and outputs a selected beam 625. Thus, switches 610, 620 collectively, or the single K+1:1 switch by itself, serve as an optical an optical switch system configured to select one from among the K laser light sources and a reference beam and output the selected beam 625.

The selected beam 625 is directed into a 1:2 splitter 630 to create identical first and second selected split beams. One of the selected split beams is directed as a first input 642 into an optical detector 650. The second selected split beam is directed into a delay 640 before being directed as a second input 644 into the optical detector 650. Preferably, the delay 640 comprises a delay line having a length adjusted such that the delay applied to the second split beam is one symbol period. The optical detector 650 converts the two optical signals into a digitized electrical signal 652 that is proportional to $e^{j\omega T}$, where T is the delay of delay line 640 and $\omega$ is the frequency of the selected beam 625.

A controller 600 is configured to receive the digitized electrical signal 652 and output one more frequency calibration control signals to control the light source(s) responsible for creating the K laser light beams 601. More particularly, controller 660, which preferably is implemented as a microprocessor or the like, receives the digitized signal 652 from the optical detector 650 and estimates the frequency of the selected beam 625 using the known value of the delay, T. The controller 660 compares the measured frequency to the desired frequency, $\omega_{ik}$, and generates frequency calibration control signal 334, 534, which is sent to the subchannel light source corresponding to the chosen light beam 611. The frequency (wavelength) of the subchannel light source is thus adjusted to the desired frequency based on the frequency calibration control signals 334, 534.

The empirical value of the delay, T, is calculated by selecting the reference light beam 622 and measuring the phase of the resulting two split beams. The reference laser 621 is preferably a CW laser that is capable of generating a very stable light beam of known frequency. The controller 660 determines T from signal 652 based on the known value of the reference laser frequency. The value of T determined by the controller 660 is stored and used by the controller 660 to measure the frequencies of the subchannel light beams 601. The controller outputs a suite of optical detector control signals 681 and also controls switches 610, 620 such that each subchannel light source is sequentially calibrated.

In a preferred embodiment a single frequency calibrator is used for the k subchannels and is used for both the transmitter and the receiver, with each pair of the co-located transmitters 250 and receivers 260 sharing that single frequency calibrator. Alternatively, a single frequency calibrator may be used for all N channels, with all N co-located transmitters 250 and receivers 260 sharing that single frequency calibrator. In such case, the single frequency calibrator is time-shared by the N channels through a switching mechanism which selects the light source associated with a particular transmitter/receiver pair being calibrated at any given instant.

Optical Phase Detector

Figure 7:
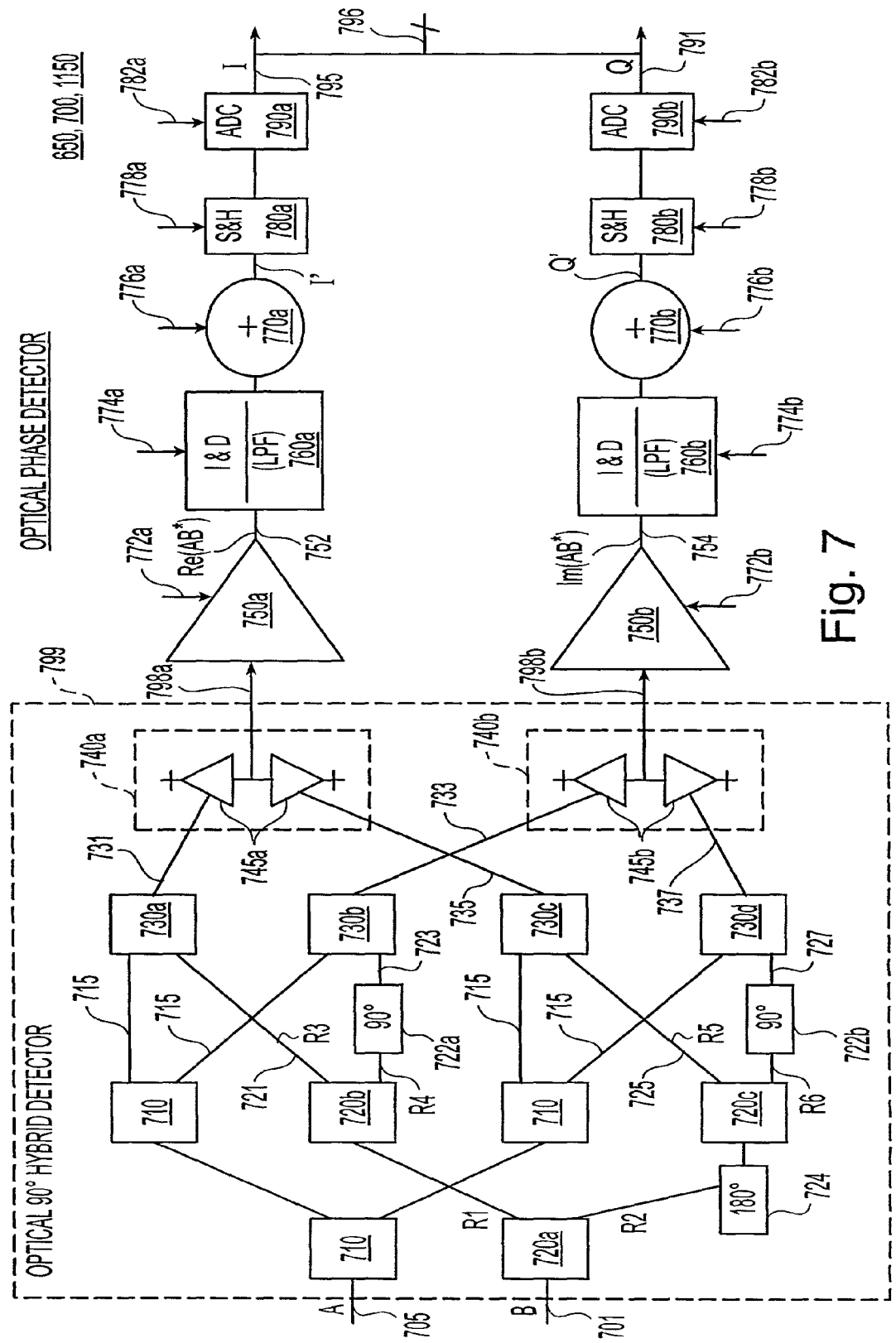
FIG. 7 is a block diagram of the optical phase detector in a preferred embodiment of the present invention.

FIG. 7 presents a block diagram of the optical phase detectors 700, seen in FIGS. 5a and 5b and the optical phase detector 650 seen in FIG. 6. The optical phase detector receives two optical beams 705, 701 and generates two electrical signals 795, 791 corresponding to the in-phase and quadrature components of the multiplication of 705 by the complex conjugate of 701. One of the two beams, designated as A in FIG. 7, is referred to as a signal beam. The second optical beam 701, designated as B in FIG. 7, is referred to for convenience as a reference beam in this description of the optical phase detector. It should be kept in mind, however, that the 'reference beam' 701 may be something other than an unmodulated train of pulses having no information.

The signal beam 705 is split into four beams identified by 715 in FIG. 7. In a referred embodiment, the signal beam 705 is split into four beams by a cascade of 1:2 splitters 710. In another embodiment, the signal beam 705 may be directly split into four beams by a single 1:4 splitter. Regardless of how they are formed, the four signal beams 715 are directed into four 2:1 combiners 730a, 730b, 730c, and 730d.

The reference beam 701 is first subjected to a 1:2 splitter 720a to form identical beams R1 and R2. Beam R1 is then subjected to a second 1:2 splitter 720b to form identical beams R3 and R4. Meanwhile, Beam R2 is first subjected to a 180° phase shifter 724 before being spilt by 1:2 splitter 720c to thereby form identical beams R5 and R6. Beam R3 is input as signal 721 to combiner 730a while beam R4 is first subjected to a first 90° phase shifter 722a before being input to combiner 730b as signal 723. Beam R5 is input as signal 725 to combiner 730c while beam R4 is first subjected to a second 90° phase shifter 722b before being input to combiner 730d as signal 727.

The resulting beams R3, R4, R5 and R6, represented as signals 721, 723, 725, and 727 are phase-shifted by 90° increments. Beam R3/721 has zero phase shift and is combined with one of the four signal beams 715 in 2:1 combiner 730a to produce first combined beam 731 that is the sum of the signal and reference beam, designated as A+B. Beam R4/723 has a 90° phase shift and is combined with one of the four signal beams 715 in second 2:1 combiner 730b to produce second combined beam 733 that is designated as A+jB. Beam R5/725 has a 180° phase shift and is combined with one of the four signal beams 715 in third 2:1 combiner 730c to produce third combined beam 735 that is the difference between the signal beam and reference beam and is designated as A−B. Finally, beam R6/727 has a 270° phase shift and is combined with one of the four signal beams 715 in fourth combiner 730d to produce fourth combined beam 737 that is designated as A−jB.

The first and third combined beams 731, 735 are input to a first matched detector 740a. The first matched detector 740a includes light sensors 745a, to thereby generate electrical signals 798a that are proportional to the intensity difference between the first and third combined beams 731, 735. The light sensors 745a are preferably photoelectric detectors such as p-n, p-i-n, or Schottky-barrier photodiodes, and are selected to generate substantially identical electrical signals for the same incident light beam. The electrical signals 798a generated by the first matched detector 740a are input to a first amplifier 750a. The output signal 752 of the first amplifier 750a is proportional to the in-phase difference between the signal beam 705 and the reference beam 170 (real{AB*}) and so can be considered a detected analog in-phase signal.

The second and fourth combined beams 733, 737 are directed to a second matched detector 740b comprising matched light sensors 745b, to thereby generate electrical signals that are proportional to the intensity difference between the second and fourth beams 733, 737. The electrical signals 798b generated by the second matched detector 740b are input into a second amplifier 750b. The output signal 754 of the second amplifier 750 is proportional to the quadrature phase difference between the signal beam 705 and the reference beam 701 (imag{AB*}) and so can be considered a detected analog quadrature signal. The splitters, phase shifters, combiners and detectors together comprise an optical 90° hybrid detector 799 that outputs the detected analog signals 798a, 798b. Additional information about the operation and construction of the optical hybrid detector 799 is described in Kazovsky, et al., "*All-fiber 90° optical hybrid for coherent communications,* " Applied Optics [23]3, February, 1987.

The analog amplifiers 750a, 750b preferably are controlled by gain control signals 772a, 772b, respectively, provided by a phase detector controller (not shown in FIG. 7). The amplified detected analog signals from the amplifiers 750a, 750b are input to filters 760a, 760b, respectively, which are controlled by clock adjustment signals 774a, 774b, respectively, from the phase detector controller, which preferably is implemented as part of a synchronization and symbol timing module associated with the receiver's processor.

The filters 760a, 760b allow only the subchannel signal corresponding to the $\lambda_{ik}$ of the local light source to pass through to the sample & holds (S&H) 780a, 780b, respectively. In a preferred embodiment for the detector 650 seen in the frequency calibration unit 600 of FIG. 6, the filters 760a, 760b are implemented as analog low pass filters.

In a preferred embodiment for transmitters in which the frequency spacing between the spectral lines is some value Δf, the filters 760a, 760b are implemented as integrate & dump (I & D) filters which integrate the received signal over one symbol period of duration 1/Δf. The I & D filter is based on a property described by the equation:

$$\Delta f \cdot \int_{t=0}^{1/\Delta f} e^{j2\pi(f_o+k\cdot\Delta f)t} \cdot e^{-j2\pi(f_o+l\cdot\Delta f)t} dt = \delta_{k,l} \quad (4)$$

where Δf is the frequency spacing between subchannels, k and l are subchannel indices, and $f_o$ is the channel frequency. The orthogonal property described in equation 1 indicates that a reference signal (represented as one of the exponentials) is able to select the one signal matching the frequency of the reference signal from a multiplexed signal. In order to make use of the orthogonal property of equation 4, the subchannel frequencies must have a frequency spacing of Δf. In order to sample only one symbol per integration, the integration period, 1/Δf, must be less than the symbol period. In a preferred embodiment, the frequency spacing is 6.25 GHz resulting in an integration period of 160 ps which is less than the 200 ps symbol period (5.0 GHz symbol rate). The start of integration and the integration period is determined by a timing signal 774a, 774b provided to the filters 760a, 760b from the symbol time recovery module within the receiver's processor.

The detected analog in-phase and quadrature subchannel signals output by the 760a, 760b, respectively, is then subject to dc bias adjustment 770a, 770b based on bias signals 776a, 776b, respectively. The dc bias adjustment is provided by the phase detector controller based on the energy in the signals output by the filters.

The filtered and bias-adjusted analog subchannel signals I' and Q', respectively, are converted to digital form by sample and hold ("S&H") units 780a, 780b, respectively, which are controlled by synchronization signals 778a, 778b, respectively from the phase detector controller.

The output of the sample and hold units is then sent on to analog-to-digital converters (ADCs) 790a, 790b, to form the in-phase I 795 and quadrature Q 791 digitized subchannel signals which may be carried on common bus 796. The ADCs 790a, 790b are themselves controlled by ADC control signals 782a, 782b, respectively, from the phase detector controller.

PMD Compensation

As discussed above with reference to FIG. 4, each symbol contains four bits of information from a data stream and is multiplexed onto two orthogonal polarization states before being transmitted through an optical fiber to the receiver. The optical fiber causes the propagating signal to undergo PMD resulting in a rotation of the original polarization states. The rotation is time varying and random and depends, in part, on the temperature and stress along the fiber. As a result of the rotation, the SOP of the received signal will not be aligned with the polarization axes of the subchannel polarizing beam splitter 540 and the beams exiting the polarizing beam splitter will contain signals from both of the original polarization states instead of just one of the original polarization states thereby decreasing the SNR of the received signal. The purpose of the PMD compensation module associated with the receivers 560, 575 is to restore the SOP of the received signal to minimize the effect of the PMD caused by the fiber.

Figure 8:
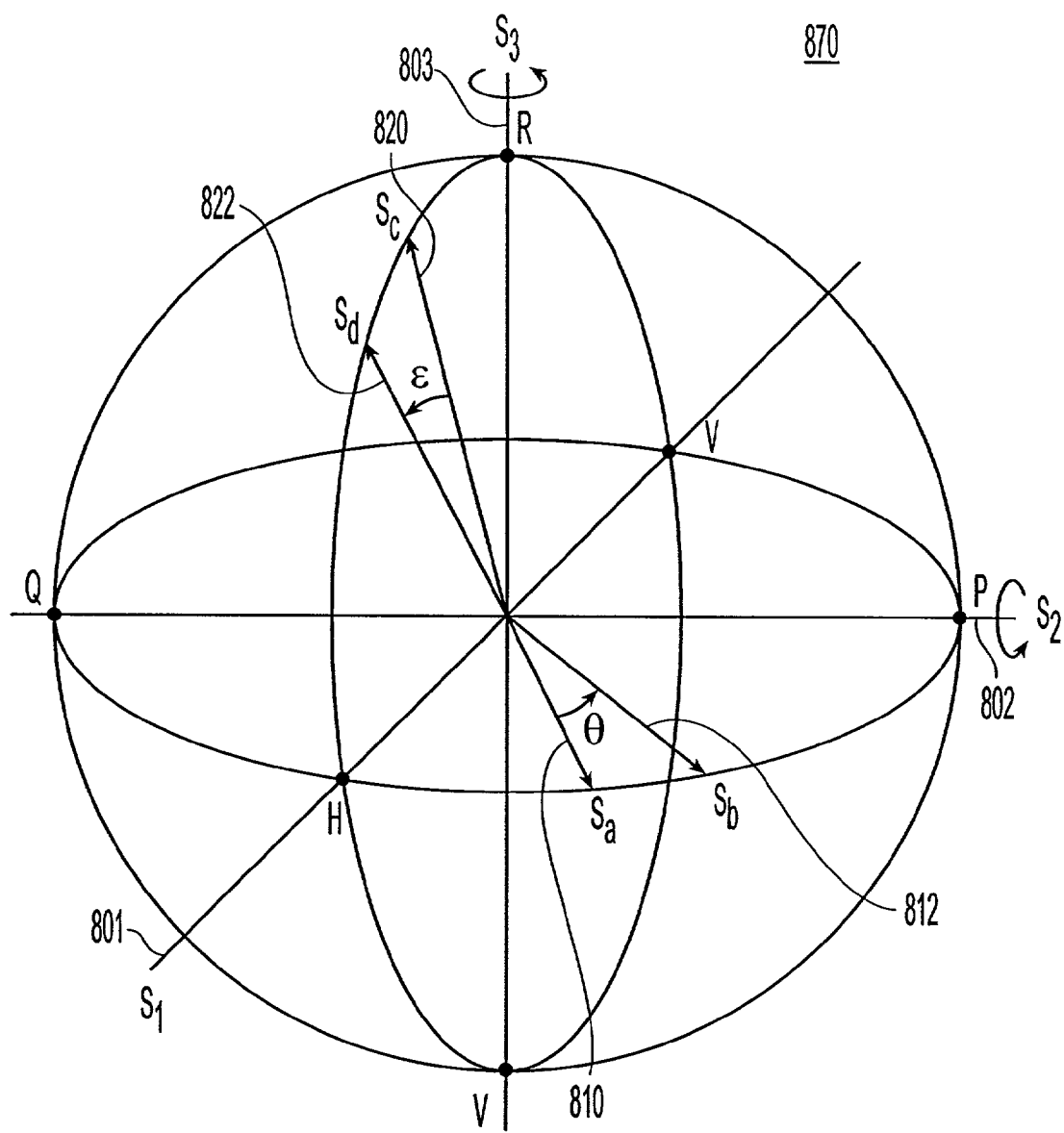
FIG. 8 is a Poincare' sphere representing the polarization state of a signal.

FIG. 8 illustrates the problem of PMD and the effect of PMD compensation. FIG. 8 shows a Poincare sphere representation 870 of the polarization state of a signal. The SOP of a signal may be represented by a 3-element Stokes vector $S=(s_1, s_2, s_3)$, where $s_1$ is the difference in the normalized power of the linear horizontal and vertical polarization components of the signal, $s_2$ is the difference in the normalized power of the linear +45° and −45° polarization components of the signal, and $s_3$ is the difference in the normalized power of the circularly right and left polarization components of the signal. The points R and L on the sphere represent a right circularly polarized signal and a left circularly polarized signal, respectively. The points H, V, P and Q on the sphere represent linearly polarized horizontal, vertical, 45° and −45° signals, respectively.

The components of the Stokes vector, S, are given by the equations:

$$S=(s_1, s_2, s_3) \quad (5)$$

where $$s_1=(vv^*-hh^*)/s_o \quad (6)$$

$$s_2=2Re(vh^*)/s_o \quad (7)$$

$$s_3=2Im(vh^*)/s_o \quad (8)$$

$$s_o=(vv^*+hh^*)/s_o. \quad (9)$$

The term, $s_o$, is a normalizing factor such that all Stokes vectors have a unit length and the locus of all possible Stokes vectors traces a sphere 870 of unit radius. The Stokes components are calculated from any two orthogonal polarization states of the signal, designated as v and h in the equations. The SOP of a signal may be transformed by performing rotations about two axes. For example, in FIG. 6 vector $s_a$ 810 may be transformed into vector $s_b$ 812 by a rotation, θ, about the R-L axis 603. Similarly, vector $s_c$ 820 may be displaced into vector $s_d$ 822 by a rotation, $\epsilon$, about the P-Q axis 802. Thus, the transformation of any unit vector into another may be described by a pair of rotations, $\theta$ and $\epsilon$.

The PMD compensation control module 592, 596 associated with either processor 560 of FIG. 5a or processor 575, respectively, of FIG. 5b calculates these rotations $\theta$ and $\epsilon$ for each polarization component.

In the embodiment corresponding to FIGS. 5a & 5c, this is done digitally by the PMD compensation control module 592 by calculating the operation given by equations 1–3. For this, it must first calculate the needed rotations and then form the rotation matrix $\underline{T}$. The $\underline{T}$ matrix has coefficients $T_{rc}$, where r and c are indices that run from 1 to 2, given by:

$$T_{11} = \cos(\theta_v/2)\cos(\epsilon_v/2) - j\sin(\theta_v/2)\sin(\epsilon_v/2) \quad (10)$$

$$T_{12} = -\sin(\theta_v/2)\cos(\epsilon_v/2) + j\cos(\theta_v/2)\sin(\epsilon_v/2) \quad (11)$$

$$T_{21} = \sin(\theta_h/2)\cos(\epsilon_h/2) + j\cos(\theta_h/2)\sin(\epsilon_h/2) \quad (12)$$

$$T_{22} = \cos(\theta_h/2)\cos(\epsilon_h/2) + j\sin(\theta_h/2)\sin(\epsilon_h/2), \quad (13)$$

with the angles $\theta_v$, $\epsilon_v$, $\theta_h$ and $\epsilon_h$ representing the rotation of the v' and h' polarization components.

In the embodiment corresponding to FIGS. 5b & 5d, the PMD compensation control module 596 associated with the processor 575 calculates these same angles and outputs them as control signals to drive the PMD compensator 538.

All-Digital PMD Compensation Algorithm

Figure 9A:
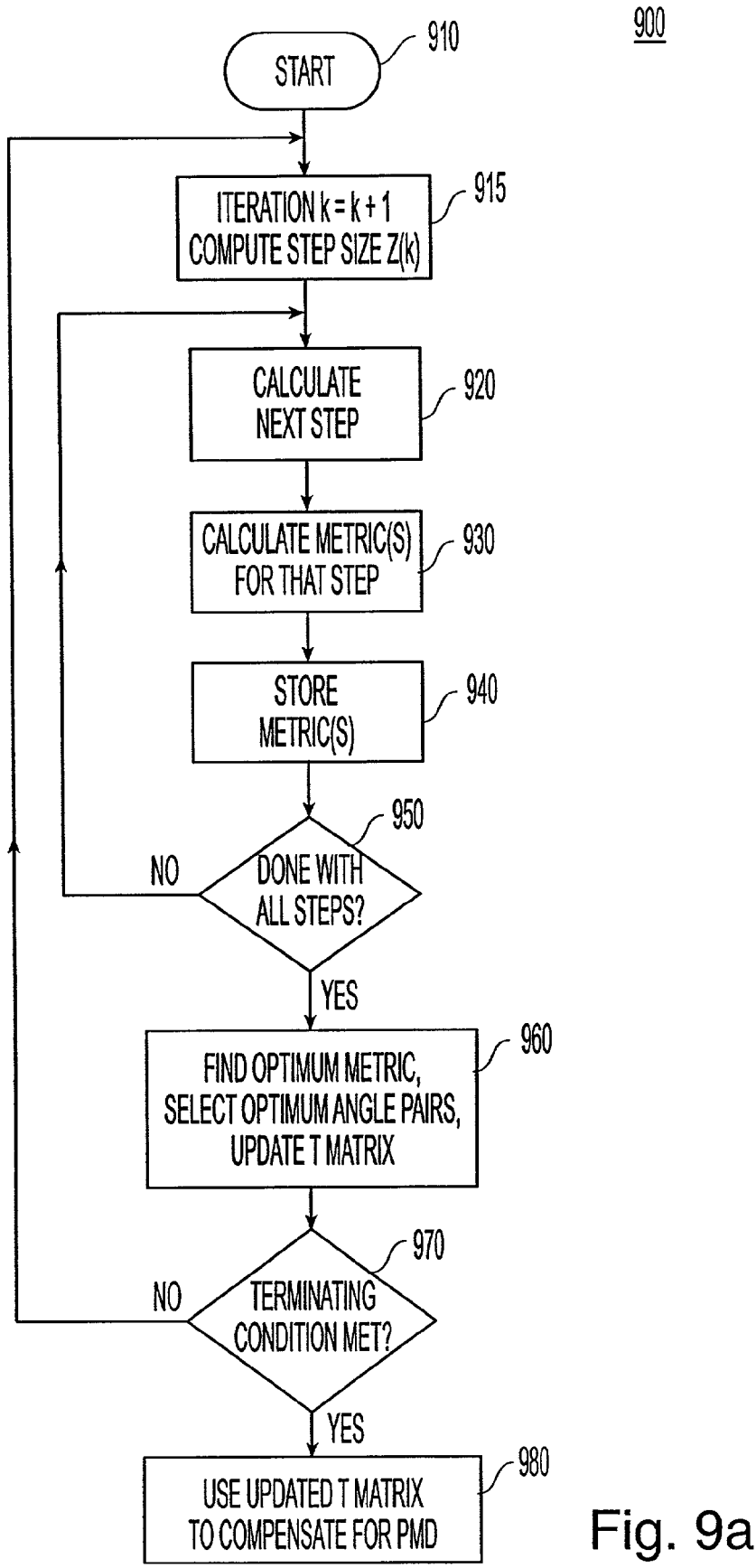
FIG. 9 is a flow diagram of the PMD controller.

FIG. 9a is a flow diagram 900 of the PMD compensation control algorithm within the PMD compensation control module 591 associated with receiver processor 560. The PMD compensation control algorithm preferably is implemented in software. The PMD compensation algorithm executes a search procedure to find the coefficients of the rotation matrix $\underline{T}$ which, when applied to the digitized signals 452a, 452b of FIG. 5a, restores the original SOP of its components. The search of the coefficients of $\underline{T}$ is directed towards the optimization of at least one predetermined criteria. Only the optimal rotation matrix $\underline{T}$, as determined by the PMD compensation control algorithm, is applied to the digitized signals 452a, 452b comprising h'[p] & v'[p] to create the compensated signals h[p] & v[p]. Thus, the compensated digital signals h[p], v[p] do not inherit the noise associated with the search routine.

In a preferred embodiment, the sequence 900 represented in FIG. 9 is periodically entered at step 910 while the channel receiver 500 receives optical signals. The search is an iterative procedure. For each iteration loop k, the current state of the rotation matrix $\underline{T}[k]$ is defined by the two pairs of angles ($\theta_v[k-1]$, $\epsilon_v[k-1]$) and ($\theta_h[k-1]$, $\epsilon_h[k-1]$) as in equations 10–13.

In step 915, a candidate step size Z(k), preferably dependent on the loop iteration number k, is determined.

In step 920, the next search step, which includes a step direction, is calculated. The search step is defined as a pair of incremental angles ($\Delta\theta$, $\Delta\epsilon$) that corresponds to the SOP rotation by $\Delta\theta$ and $\Delta\epsilon$ around the R-L and P-Q axes on the Poincare sphere. For each iteration loop k, the search procedure investigates nine possible SOP rotation directions defined by the angles ($\theta_v[k-1]+m\Delta\theta$, $\epsilon_v[k-1]+l\Delta\epsilon$, $\theta_h[k-1]+m\Delta\theta$, $\epsilon_h[k-1]+l\Delta\epsilon$), where m=−1,0,1 and l=1,0,1.

In step 930, for each rotation defined by the candidate angle combination ($\theta_v^m$, $\epsilon_v^l$, $\theta_h^m$, $\epsilon_h^l$) calculated in step 920, a pre-selected metric is computed. The metric may be the signal-to-noise ratio (SNR), envelope stability (ENV), differential power ($\Delta$P), or other metrics known to one of skill in the signal processing art. The selection of the particular metric may be matched to the coding format of the signal. n a preferred embodiment, the ENV metric is selected to optimize the transformed signal. The ENV metric is calculated for each polarization as $$\begin{pmatrix} ENV_v^{ml} \\ ENV_h^{ml} \end{pmatrix} = \begin{pmatrix} \mu_V^2/\sigma_V^2 \\ \mu_H^2/\sigma_H^2 \end{pmatrix} \quad (18)$$

$$\text{where } \mu_V = \frac{1}{P}\sum_{p=0}^{P-1}\left|(A^{ml}\ B^{ml})\cdot\begin{pmatrix} v'[p] \\ h'[p] \end{pmatrix}\right|^2 \quad (19)$$

$$\sigma_V^2 = \frac{1}{P}\sum_{p=0}^{P-1}\left(\left|(A^{ml}\ B^{ml})\cdot\begin{pmatrix} v'[p] \\ h'[p] \end{pmatrix}\right|^2 - \mu_V\right)^2 \quad (20)$$

$$\mu_H = \frac{1}{P}\sum_{p=0}^{P-1}\left|(C^{ml}\ D^{ml})\cdot\begin{pmatrix} v'[p] \\ h'[p] \end{pmatrix}\right|^2 \quad (21)$$

$$\sigma_H^2 = \frac{1}{P}\sum_{p=0}^{P-1}\left(\left|(C^{ml}\ D^{ml})\cdot\begin{pmatrix} v'[p] \\ h'[p] \end{pmatrix}\right|^2 - \mu_H\right)^2 \quad (22)$$

The coefficients $A^{ml}$, $B^{ml}$, $C^{ml}$, and $D^{ml}$ are defined in relevance with equations 10–13 as $A^{ml}=T_{11}$, $B^{ml}=T_{12}$, for $\theta_v=\theta_v^m$ and $\epsilon_v=\epsilon_v^l$ $C^{ml}=T_{21}$, $D^{ml}=T_{22}$, for $\theta_h=\theta_h^m$ and $\epsilon_h=\epsilon_h^l$ The components of ENV given in equations 19–22 are averages over a total of P symbols, the first of a continuum of P, preferably consecutive symbols, being arbitrarily assigned an index of p=0 for these equations. The selection of the total number P of such symbols being used to calculate these metrics depends on system requirements and other parameters, as is known to those skilled in the art.

In step 940, the resulting values $ENV_v^{ml}$ and $ENV_h^{ml}$ and their associated angle pairs ($\theta_v^m$, $\epsilon_v^l$) and ($\theta_h^m$, $\epsilon_h^l$) are stored.

In step 950, a determination is made to see whether all possible candidate search steps have been evaluated. If not, steps 920–950 are repeated for another one of the candidate search steps. If, at step 950, it is determined that all nine possible candidate search steps have been evaluated, control goes to step 960.

In step 960, the optimum metric(s) are identified, and the two optimal rotation angle pairs ($\theta_v^o$, $\epsilon_v^o$) and ($\theta_h^o$, $\epsilon_h^o$) are selected according to an optimization criterion. In the preferred embodiment, the optimization criterion is the maximum ENV value. The rotation angles for this iteration $\theta_v[k]$, $\epsilon_v[k]$, $\theta_h[k]$, and $\epsilon_h[k]$ are also update with the optimal angles $\theta_v^o$, $\epsilon_v^o$, $\theta_h^o$, and $\theta_h^o$ that maximize $ENV_v$ and $ENV_h$ values. And these are used to update the T matrix using Equations 10–13 given above.

In step 970, a determination is made to see whether a loop terminating condition has been met. The terminating condition may be reached when there are no more changes in the optimal angles after an iteration, or it may be reached upon executing a predetermined number of iterations. Other terminating conditions may also be employed. If the terminating condition is not met, the process continues with the next iteration. If, on the other hand, the terminating condition is met, then control flows to step 980.

In step 980, the updated, optimum rotation angles are used to create the coefficients for the T matrix. For the embodiment corresponding to FIGS. 5a & 5c, this means that the coefficients of the rotation matrix $\underline{T}[k]$ are computed using the optimal angles $\theta_v^\circ$, $\epsilon_v^\circ$, $\theta_h^\circ$, and $\theta_{h'}^\circ$. The entire process 900 is repeated at a predetermined rate so long as that subchannel receiver is in operation.

In the above description of the flow diagram 900, the search step size calculated in step 920 was kept constant. In an alternate embodiment, the search step size may be adaptively adjusted with every search iteration, the size depending on one of several parameters, such as the calculated metric. When the calculated metric is the ENV metric discussed above, a step size $\Delta\theta=\Delta\epsilon=Z[k]$ can be used for the kth search iteration, with the value Z[k], given in degrees, being given by $$Z[k] = \begin{cases} 1, & \text{if } ENV[k-1] > ENV_{target} \\ \lfloor 3(ENV_{target} - ENV[k-1]) \rfloor + 1, & \text{otherwise} \end{cases} \quad (23)$$

where ENV[k−1] is the maximum ENV from the previous search iteration and $ENV_{target}$ is a preset target value. The selection of the target value may be based on the desired bit error rate for the system. In this example, Z preferably is constrained to a predetermined range, such as the range [0:30].

Polarization Controller PMD Compensation Algorithm

Figure 9B:
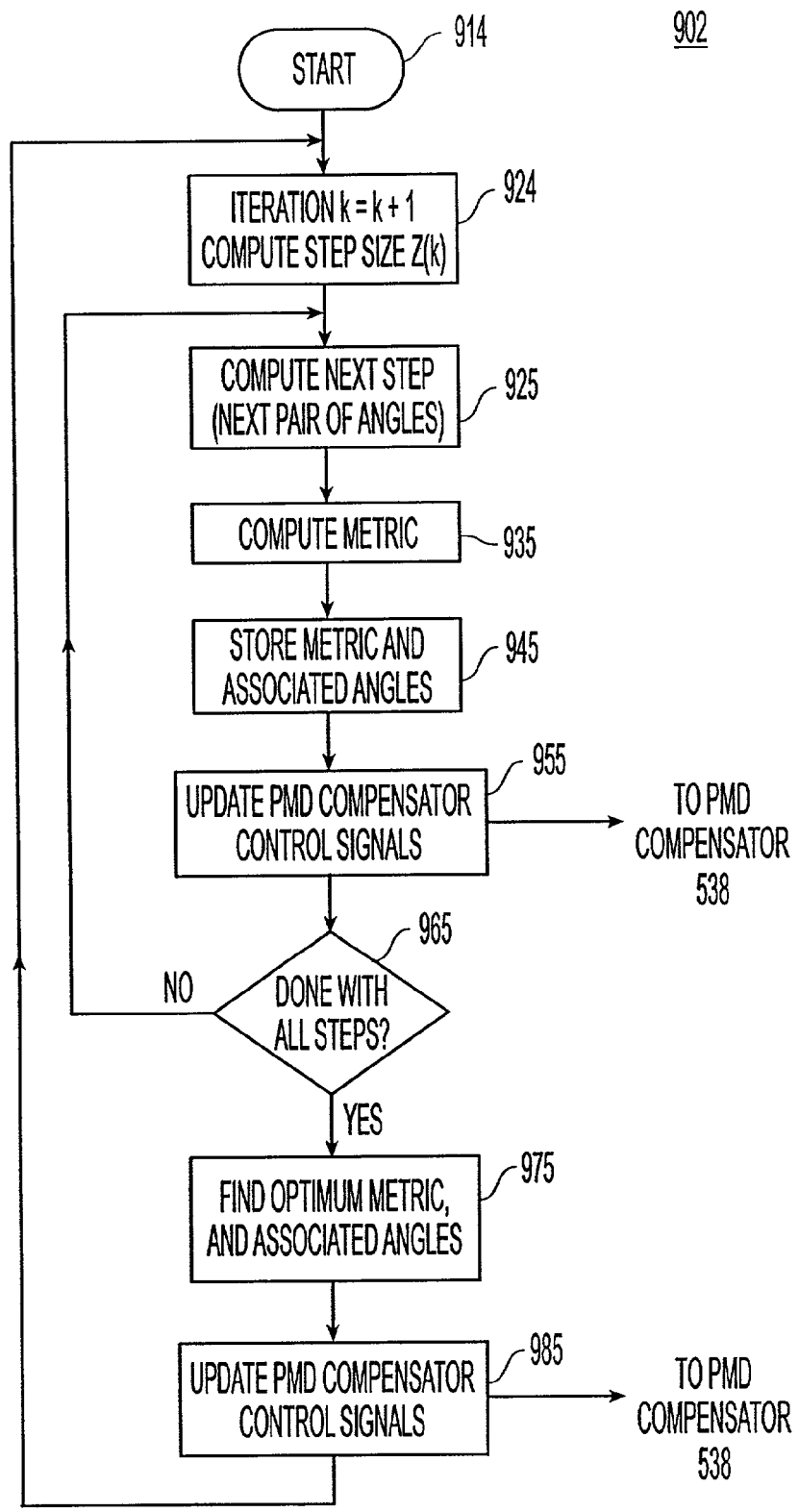

FIG. 9b is a flow diagram 902 of the PMD compensation control algorithm within the PMD compensation control module 596 associated with receiver processor 575, for the embodiment corresponding to FIGS. 5b & 5d. The PMD compensation control module 596 operates on the compensated digital signals 454a, 454b, representing h[p] & v[p] rather than on the uncompensated digital values h'[p], v'[p]. In this embodiment, the optimal angles are output to the PMD compensator 538 to effect the necessary correction.

The PMD device control signals 585 from the PMD compensation control module 596 associated with processor 575 (FIGS. 5b & 5d) include a pair signals designated for present purposes as Cv1 and Cv2. The current state of the PMD compensator is defined by the control signals Cv1 and Cv2, where Cv1 is proportional to $\theta/2$, and Cv2 is proportional to $\epsilon/2$. The control algorithm peforms an iterative search routine to find the optimum angles.

Each iteration involves testing 9 possible SOP rotations (as in the digital case). The ENV metric is computed for each test and its value is stored along with the rotation angles. The iteration is completed when all 9 tests have been completed. Then, the optimal ENV metric is selected and the control signals to the PMD compensator are updated with the optimal ones. Then next iteration begins. The control signals to the PMD compensator 538 are updated for each test step in each iteration. This differs from the "all-digital" case where the final updates are made only when search algorithm has converged.

After commencing in step 914, in step 924, the algorithm computes a candidate step size Z(k), preferably dependent on the loop iteration number k.

In step 925, the next iteration step, i.e., the next pair of the nine candidate angles is selected.

In step 935, the ENV metric is computed by the PMD compensation control module 596 using signals h[p], v[p] from lines 454a, 454b, respectively, as follows:

$$ENV_H^{ml} = \frac{\mu_H^2}{\sigma_H^2}, \quad ENV_V^{ml} = \frac{\mu_V^2}{\sigma_V^2}, \text{ where}$$

$$\mu_H = \frac{1}{P}\sum_{p=0}^{P-1}|h[p]|^2, \quad \sigma_H^2 = \frac{1}{P}\sum_{p=0}^{P-1}(|h[p]|^2 - \mu_H)^2, \text{ and}$$

$$\mu_V = \frac{1}{P}\sum_{p=0}^{P-1}|v[p]|^2, \quad \sigma_V^2 = \frac{1}{P}\sum_{p=0}^{P-1}(|v[p]|^2 - \mu_V)^2.$$

In step 945, the calculated metrics and associated angles are stored and the control signals Cv1 and Cv2 are calculated from these angles.

In step 955, the processor 575 outputs the control signals Cv1 and Cv2 (which, as stated above, belong to the suite of controls signals generally shown as 585) to the PMD compensator 528, thereby adjusting the instantaneous values of h[p] and v[p].

In step 965, a determination is made to see whether all nine candidate angle pairs have been tried. If not, control returns to step 925 to compute the next angle pair. If, on the other hand, all nine pairs have been attempted, control goes to step 975.

In step 975, the optimum metric and associated angles are determined from among the nine calculated sets, and the corresponding optimum control signals Cv1 and Cv2 are calculated Finally, in step 985, the PMD compensator 538 is updated using the optimum control signals Cv1 and Cv2.

Again, the entire process 902 is repeated while the receiver is operating.

Symbol Timing Recovery

The symbol time recovery module can include a Stokes-based timing error detector module ("Stokes module"), a Mueller & Muller timing error detector module ("M&M module"), or be a hybrid comprising both.

The Stokes module does not require PMD-compensated signals to provide a sufficiently accurate signal to create clock adjustment signal for use by the optical detectors 700a, 700b. Instead, the Stokes module can use the uncompensated digital signals 452a, 452b (h'[v] & v'[p]). Thus, the Stokes module is well-suited for the "all-digital" embodiment corresponding to FIGS. 5a & 5c. The output of the Stokes module is used to generate the timing error signal, $\tau_s$, that is translated into a clock adjustment signal directed towards minimization of the variance of the computed Stokes parameters, thereby leading to a reduction of the timing error, $\tau_s$.

The Stokes module within the symbol timing recovery module is based on the estimation of the variance of Stokes parameters obtained from the digitized signals 452a, 452b. In general, the variance of the Stokes parameters is minimal when the timing error is zero, and it grows as the timing error increases. The Stokes algorithm within the symbol timing recovery module results in the processor outputting clock adjustment signals 774a, 774b as part of the suite of control signals 581. Applying the clock adjustment signals 774a, 774b to the Integrate & Dump units 760a, 760b of FIG. 7, leads to a minimization of variance of the Stokes parameters.

The Stokes based timing error detector computes the discriminator function, $DF(\tau)$. In a preferred embodiment, the discriminator function is given by $$DF(\tau_s) = 1 - \frac{1}{P}\sum_{p=0}^{P-2}|(S[p] \circ S[p+1])| \qquad (24)$$

where $\tau_s$ is the normalized timing error and the inner product of the two Stokes vectors is given by $$S[p] \circ S[p+1] = s_1[p]s_1[p+1] + s_2[p]s_2[p+1] + s_3[p]s_3[p+1]. \qquad (25)$$

In equation 24, P is the number of inner products of the most recent Stokes vectors used to estimate the variance. In general, the value of P is preset and is selected to satisfy the system requirements.

Figure 10:
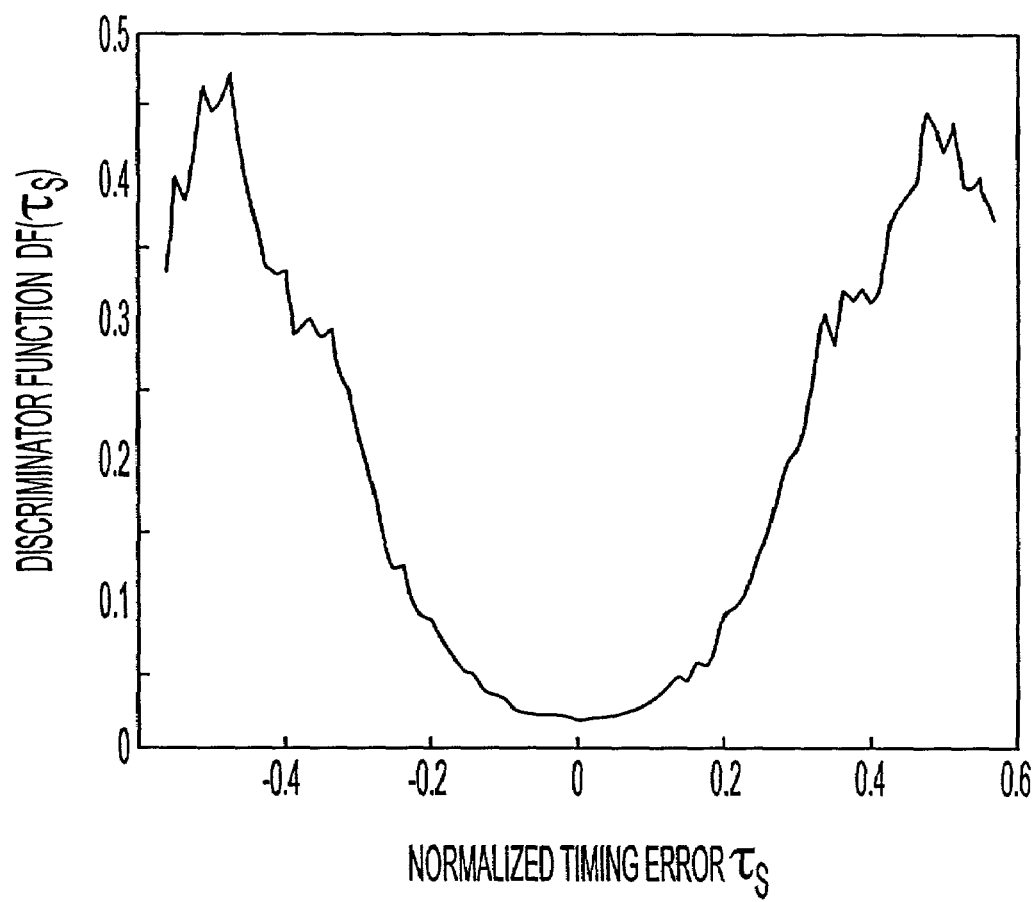
FIG. 10 is a graph of the discriminator function used in the Stokes' based timing error detector.

FIG. 10 shows the discriminator function of equation 24 where P=1280. More particularly, FIG. 10 shows a symmetric discriminator function with a minimum when the timing error is zero.

Based on the discriminator function output, the Stokes recovery algorithm computes the timing error signal $\tau_s$. The timing error signal $\tau_s$ is translated to a clock adjustment signal directed towards the reduction of the estimated error. The discriminator function output does not provide the sign of the timing error. To mitigate the sign ambiguity, the symbol recovery algorithm, for example, may use a gradient search method to initially find the occurrence of the minimum variance and use a dithering technique to track that minimum as the symbol timing may drift.

Unlike the Stokes module, the M&M module uses the polarization compensated signals, h[p] and v[p], rather than the uncompensated signals h'[p] and v'[p]. More particularly, the M&M module uses the compensated signals to estimate a timing error, $\tau_M$. The timing error, $\tau_M$ is then translated into a clock adjustment signal 774a, 774b which is directed towards driving the timing error estimate $\tau_M$ to zero. Implementation of the M&M module is well-known to those of skill in the signal processing art and so is not described here in further detail. However, it should be understood that, as used herein, the term "M&M module" is representative of any detector capable of recovering the symbol timing of a PMD-compensated received signal, known to those skilled in the art of digital receivers.

The symbol timing recovery module may comprise a hybrid of a Stokes module and an M&M module. In a hybrid symbol timing recovery module, when uncompensated signals h'[p] & v'[p] are input to the processor (such as processor 560 in FIG. 5a), the hybrid module is typically programmed or otherwise configured to first invoke the Stokes module during a first period of time, and then invoke the M&M module thereafter. The reason for this protocol is now explained.

When the subchannel receiver 510 of FIG. 5a begins to process received optical signals, the uncompensated signals h'[p] & v'[p] are made available to the processor 560. As this happens, the PMD compensation module within the processor is invoked to calculate the various T-matrix coefficients for use in Equations 1–3 to help produce the compensated signals h[p] & v[p].

However, it takes some time for the PMD compensation module to internally output accurate values of the compensated signals h[p] & v[p]. During this start-up time in which the compensated signals h[p] & v[p] are of insufficient quality (e.g., not very accurate), the M&M module cannot be used to create symbol timing recovery signals, such as the clock adjustment signals 774a, 774b. Therefore, during this start-up time, the PMD compensation module invokes the Stokes module to process the uncompensated signals h'[p] & v'[p] and output the appropriate clock adjustment signals 774a, 774b to drive the I &D units 760a, 760b. After the start-up time, however, the values of the compensated signals h[p] & v[p] are more accurate, and the symbol timing recovery module within the processor has the M&M module operate on the "more accurately" compensated signals h[p] & v[p] to output the needed clock adjustment signals 774a, 774b.

The length of the startup time is based on the time needed to ensure that the PMD compensation algorithm has converged to an optimum compensation solution, after which the M&M module is used. The duration of the start-up time may be based on system parameters, or may simply be selected to be correspond to when an aforementioned terminating condition is reached.

In general, using the M&M module results in a lower bit-error rate (BER) because the timing error signal generated by the M&M module is more accurate than the one generated by the Stokes module. Therefore, it is preferred that a hybrid symbol detection module first invoking the Stokes module and later the M&M module be used in those cases where the processor receives uncompensated signals as input, such as discussed above with respect to FIG. 5a. However, in those cases where the processor receives compensated signals as input, such as in the embodiment seen in FIG. 5b, the M&M module alone preferably is used.

The invention described and claimed herein is not to be limited in scope by the preferred embodiments herein disclosed, since these embodiments are intended as illustrations of several aspects of the invention. Any equivalent embodiments are intended to be within the scope of this invention. Indeed, various modifications of the invention in addition to those shown and described herein will become apparent to those skilled in the art from the foregoing description. Such modifications are also intended to fall within the scope of the appended claims.

What is claimed is:

1. An optical communication receiver comprising:

an optical splitter having a splitter input and a plurality of splitter outputs, the optical splitter configured to receive an optical channel signal comprising a number K subchannel signals, and output K identical received channel signals;

K subchannel receivers, the subchannel receiver comprising optical and digital circuitry configured to receive the $k^{th}$ of said K identical received channel signals and a reference light beam having a subchannel frequency $f_k$, and output a first digital signal representative of in-phase and quadrature components of a first orthogonal polarization component associated with the subchannel frequency $f_k$, and also output a second digital signal representative of in-phase and quadrature components of a second orthogonal polarization component associated with the subchannel frequency $f_k$, the first and second digital signals containing information representative of a data stream used to modulate the $k^{th}$ subchannel frequency; and a receiver processor configured to receive said first and second digital signals and output said data stream.

2. The optical communication receiver of claim 1, wherein the receiver further comprises:
a frequency calibration circuit configured to calibrate at least one light source to thereby maintain a frequency spacing of Δf between K adjacent subchannel light beams, the frequency calibration circuit receiving, as input, at least K subchannel light beams each characterized by a subchannel frequency $f_k$ and outputting at least one frequency calibration control signal applied to at least one light source creating at least one of said K subchannel light beams.

3. The optical communication receiver of claim 2, wherein the frequency calibration circuit comprises:
a first optical switch configured to select from among (a) said K subchannel light beams and (b) a reference light beam, to thereby output a selected beam;
an optical splitter configured to split the selected signal to first and second selected split beams;
an optical delay configured to receive the first selected split beam as input, delay the first selected split beam by a predetermined time delay T, and output a delayed first selected split beam;
an optical detector configured to receive the delayed first selected split beam and the second selected split beam, and output a digitized electrical signal that is proportional to $e^{j\omega T}$, where $\omega$ is the frequency of the selected beam;
a controller configure to receive the digitized electrical signal and output said at least one frequency calibration control signal.

4. The optical communication receiver of claim 1, wherein the $k^{th}$ subchannel receiver comprises:
a polarization beam splitter configured to receive and split the $k^{th}$ of said K identical receiver channel signals into first and second orthogonal polarization components;
a first optical phase detector configured to receive the first orthogonal polarization component and the reference light beam having a subchannel frequency $f_k$ as inputs, and output said first digital signal;
a second optical phase detector configured to receive the second orthogonal polarization component and the reference light beam having a subchannel frequency $f_k$ as inputs, and output said second digital signal, and wherein
the first and second digital signals are input to said receiver processor.

5. The optical communication receiver of claim 4, wherein the $k^{th}$ subchannel receiver further comprises:
a first variable optical delay configured to selectively delay the first orthogonal polarization component before it is input to the first optical phase detector;
a second variable optical delay configured to selectively delay the second orthogonal polarization component before it is input to the second optical phase detector,
wherein the first and second variable optical delays are controlled by said receiver processor.

6. The optical communication receiver of claim 4, wherein each optical phase detector includes first and second integrate and dump filters configured to integrate detected analog respective in-phase and quadrature signals for an integrating period that is less than a symbol period to thereby produce respective detected analog in-phase and quadrature subchannel signals corresponding to said subchannel frequency $f_k$.

7. The optical communication receiver of claim 1, wherein the receiver processor comprises:
a polarization mode dispersion (PMD) compensation control module configured to digitally compensate the first and second digital signals to thereby produce PMD-compensated first and second digital signals;
a synchronization and symbol timing module configured to produce optical detector control signals including at least one clock signal for controlling the subchannel receiver, based on at least one of the first and second digital signals and the first and second PMD-compensated digital signals; and
a data demodulation module configured to output the data stream that was used to modulate at least one of said K subchannels, based on the first and second PMD-compensated digital signals.

8. The optical communication receiver of claim 7, wherein the synchronization and symbol timing module includes a Stokes-based timing error detector module.

9. The optical communication receiver of claim 7, wherein the synchronization and symbol timing module also includes a Mueller & Muller timing error detector module, and wherein the Stokes-based timing error detector module is invoked first and the Muller and Muller timing error detector module is invoked thereafter.

10. The optical communication receiver of claim 7, wherein the PMD compensation control module is configured to execute an iterative search procedure to find optimum coefficients of a rotation matrix for rotating the first and second digital signals to thereby create the PMD-compensated first and second digital signals.

11. The optical communication receiver of claim 10, wherein, during each iteration, the search procedure calculates at least one metric for each of a plurality of candidate pairs of rotation angles, and selects the candidate pair of rotation angles corresponding to an optimization criterion for said at least one metric, to thereby calculate the coefficients of said rotation matrix, the iterations continuing until a terminating condition is met.

12. The optical communication receiver of claim 11, wherein a step size of the candidate pairs of rotation angles is adjusted at each iteration.

13. The optical communication receiver of claim 7, wherein the receiver processor further comprises a frequency offset compensator.

14. The optical communication receiver of claim 1, wherein the subchannel receiver comprises:
a polarization mode dispersion (PMD) compensator device configured to receive the $k^{th}$ of said K identical receiver channel signals as input and output a PMD-compensated version of said $k^{th}$ identical receiver channel signals, the PMD compensator device being controlled by at least one PMD device control signal from the receiver processor;
a polarization beam splitter configured to receive and split said PMD compensated version of said identical receiver channel signal into first and second orthogonal polarization components;
a first optical phase detector configured to receive the first orthogonal polarization component and the reference light beam having a subchannel frequency $f_k$ as inputs, and output said first digital signal;
a second optical phase detector configured to receive the second orthogonal polarization component and the reference light beam having a subchannel frequency $f_k$ as inputs, and output said second digital signal, and wherein the first and second digital signals are input to said receiver processor.

15. The optical communication receiver of claim 14, wherein the subchannel receiver further comprises:
a first variable optical delay configured to selectively delay the first orthogonal polarization component before it is input to the first optical phase detector;
a second variable optical delay configured to selectively delay the second orthogonal polarization component before it is input to the second optical phase detector, wherein the first and second variable optical delays are controlled by said receiver processor.

16. The optical communication receiver of claim 14, wherein each optical phase detector includes first and second integrate and dump filters configured to integrate detected analog respective in-phase and quadrature signals for an integrating period that is less than a symbol period to thereby produce respective detected analog in-phase and quadrature subchannel signals corresponding to said subchannel frequency $f_k$.

17. The optical communication receiver of claim 14, wherein the receiver processor comprises:
a polarization mode dispersion (PMD) compensation control module configured to produce said at least one PMD device control signal, based on the first and second digital signals;
a synchronization and symbol timing module configured to produce optical detector control signals including at least one clock signal for controlling the subchannel receiver, based on said first and second digital signals; and
a data demodulation module configured to output the data stream that was used to modulate the $k^{th}$ subchannel, based on the first and second digital signals.

18. The optical communication receiver of claim 17, wherein the synchronization and symbol timing module includes Mueller & Muller timing error detector module.

19. The optical communication receiver of claim 17, wherein the PMD compensation control module is configured to execute an iterative search procedure to find optimum rotation angles for producing the PMD device control signals.

20. The optical communication receiver of claim 19, wherein, during each iteration, the search procedure determines a candidate pair of rotation angles, calculates said at least one metric for said candidate pair of rotation angles, stores the metric, and produces said at least one PMD device control signal that is applied to the PMD compensator device, for each candidate pair of rotation angles.

21. The optical communication receiver of claim 20, wherein a step size governing selection of the candidate pairs of rotation angles is adjusted at each iteration.

22. The optical communication receiver of claim 17, wherein the receiver processor further comprises a frequency offset compensator.

23. A frequency calibration system for calibrating a number K of laser light beams, each laser light beam having a frequency $f_k$, k=1, 2, 3, . . . , K, the frequency calibration system comprising:
an optical switch system configured to select one from among the K laser light beams and a reference beam and output a selected beam;
a splitter disposed to receive the selected beam and output first identical first and second selected beams;
an optical detector configured to receive a delayed version of the first selected beam and the second selected beam, and output at least one electrical signal proportional to a phase difference between the two beams;
a controller configured to receive said at least one electrical signal and output at least one frequency calibration control signal to control at least one light source responsible for creating at least one of said plurality of laser light beams.

24. The frequency calibration system of claim 23, wherein the optical switch system comprises a K:1 switch configured to select one from among said K light beams and a 2:1 switch configured a select from among the reference light beam and said one from among said K light beams to thereby output said selected beam.

25. The frequency calibration system of claim 23, wherein the first selected 5 beam is delayed by one symbol period.

26. An iterative method for compensating for polarization mode dispersion (PMD) in an optical signal comprising:
(a) determining a candidate pair of rotation angles for adjusting a state of polarization of the optical signal;
(b) calculating at least one metric for said candidate pair of rotation angles
(c) storing the at least one metric and also outputting at least one PMD device control signal that is applied to a PMD compensator device into which the optical signal is input;
(d) repeating steps (a), (b) and (c) until metrics; for a predetermined set of candidate pairs have been calculated;
(e) finding the optimum metric and the optimum rotation angles corresponding to that metric; and
(f) outputting at least one PMD device control signal which corresponds to the optimum angles, to said PMD compensator device into which the optical signal is input.

27. The method according to claim 26, wherein the metric is an envelope stability metric.

28. The method according to claim 26, further comprising repeating steps (a)–(f) until a predetermined condition is met, and wherein a step size for the candidate pairs of rotation angles is adjusted at each iteration of steps (a)–(f).

29. A method for compensating for polarization mode dispersion (PMD) in an optical signal having two orthogonal polarizations, the method comprising:
(a) determining a candidate pair of rotation angles for adjusting a state of polarization of the optical signal;
(b) calculating at least one metric for said candidate pair of rotation angles;
(c) storing the metric;
(d) performing steps (a), (b) and (c) until metrics for a predetermined set of candidate pairs have been calculated;
(e) finding the optimum metric and the optimum rotation angles corresponding to that metric, and then updating a rotation matrix having coefficients derived from the optimum rotation angles;
(f) digitally compensating for PMD by applying the rotation matrix to digitized signals representing the information set on the two orthogonal polarizations.

30. The method according to claim 29, wherein the metric is an envelope stability metric.

31. The method according to claim 29, further comprising, before step (f), 20 repeating steps (a)–(e) until a predetermined condition is met.

32. The method according to claim 31, further comprising adjusting a step size for the candidate pairs of rotation angles at each iteration of steps (a)–(e).

* * * * *